(12) United States Patent
Park et al.

(10) Patent No.: US 11,672,018 B2
(45) Date of Patent: *Jun. 6, 2023

(54) DATA TRANSMISSION METHOD AND USER EQUIPMENT FOR THE SAME

(71) Applicant: Equo IP LLC, Wayne, PA (US)

(72) Inventors: Sung Jun Park, Anyang-si (KR); Seung June Yi, Anyang-si (KR); Young Dae Lee, Anyang-si (KR); Sung Duck Chun, Anyang-si (KR)

(73) Assignee: Equo IP LLC, Wayne, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/183,615

(22) Filed: Feb. 24, 2021

(65) Prior Publication Data

US 2021/0195655 A1 Jun. 24, 2021

Related U.S. Application Data

(63) Continuation of application No. 16/723,514, filed on Dec. 20, 2019, now Pat. No. 10,939,473, which is a
(Continued)

(30) Foreign Application Priority Data

Jun. 25, 2009 (KR) .......................... 10-2009-0057128

(51) Int. Cl.
*H04W 72/04* (2023.01)
*H04W 74/08* (2009.01)
(Continued)

(52) U.S. Cl.
CPC ....... *H04W 74/0833* (2013.01); *H04W 72/20* (2023.01); *H04W 72/21* (2023.01);
(Continued)

(58) Field of Classification Search
CPC ......... H04W 74/0833; H04W 72/0406; H04W 72/0413; H04W 72/042; H04W 72/14;
(Continued)

(56) References Cited

U.S. PATENT DOCUMENTS 5,311,176 A 5/1994 Gurney
5,553,153 A 9/1996 Eatwell
(Continued)

FOREIGN PATENT DOCUMENTS

CA 2720833 C 1/2014
CN 1437416 A 8/2003
(Continued)

OTHER PUBLICATIONS

U.S. Appl. No. 61/038,988 (Provisional Application) (Year: 2008).*
(Continued)

*Primary Examiner* — Kibrom T Hailu
(74) *Attorney, Agent, or Firm* — Volpe Koenig

(57) ABSTRACT

A mobile communication technology, and, more particularly, a method for efficiently transmitting data stored in a message 3 (Msg3) buffer and a user equipment for the same is disclosed. The method of transmitting data by a user equipment in uplink includes receiving an uplink (UP) Grant signal from a base station on a specific message, determining whether there is data stored in a message 3 (Msg3) buffer when receiving the UL Grant signal on the specific message, determining whether the specific message is a random access response message, and transmitting the data stored in the Msg3 buffer to the base station using the UL Grant signal received on the specific message, if there is data stored in the Msg3 buffer when receiving the UL Grant signal on the specific message and the specific message is the random access response message.

32 Claims, 11 Drawing Sheets

Related U.S. Application Data continuation of application No. 15/664,686, filed on Jul. 31, 2017, now Pat. No. 10,517,120, which is a continuation of application No. 15/294,351, filed on Oct. 14, 2016, now Pat. No. 9,775,177, which is a continuation of application No. 13/801,529, filed on Mar. 13, 2013, now Pat. No. 9,532,336, which is a continuation of application No. 12/972,366, filed on Dec. 17, 2010, now Pat. No. 8,422,410, which is a continuation of application No. 12/538,514, filed on Aug. 10, 2009, now Pat. No. 7,881,236.

(60) Provisional application No. 61/087,988, filed on Aug. 11, 2008.

(51) Int. Cl.
*H04W 72/20* (2023.01)
*H04W 72/21* (2023.01)
*H04W 72/23* (2023.01)
*H04L 101/622* (2022.01)

(52) U.S. Cl.
CPC ............ *H04W 72/23* (2023.01); *H04W 74/08* (2013.01); *H04L 2101/622* (2022.05); *H04W 74/0866* (2013.01)

(58) Field of Classification Search
CPC .............. H04W 74/08; H04W 74/0866; H04W 28/0278; H04W 36/0055; H04W 74/004; H04W 88/023; H04L 61/6022; H04L 1/18; H04B 7/005
See application file for complete search history.

(56) References Cited

U.S. PATENT DOCUMENTS

| | | | |
|---|---|---|---|
| 6,161,160 A | 12/2000 | Niu et al. | |
| 6,374,080 B2 | 8/2002 | Uchida | |
| 6,634,020 B1 | 10/2003 | Bates et al. | |
| 6,722,417 B2 | 4/2004 | Ban et al. | |
| 6,944,453 B2 | 9/2005 | Faerber et al. | |
| 7,047,009 B2 | 5/2006 | Laroia et al. | |
| 7,292,641 B2 | 11/2007 | Suh et al. | |
| 7,321,645 B2 | 1/2008 | Lee et al. | |
| 7,400,573 B2 | 7/2008 | Sundstrom et al. | |
| 7,417,970 B2 | 8/2008 | Shaheen | |
| 7,418,065 B2 | 8/2008 | Qiu et al. | |
| 7,424,067 B2 | 9/2008 | Vanderperren et al. | |
| 7,426,175 B2 | 9/2008 | Zhuang et al. | |
| 7,433,418 B1 | 10/2008 | Dogan et al. | |
| 7,447,504 B2 | 11/2008 | Lohr et al. | |
| 7,496,113 B2 | 2/2009 | Cai et al. | |
| 7,508,792 B2 | 3/2009 | Petrovic et al. | |
| 7,570,618 B2 | 8/2009 | Son et al. | |
| 7,580,400 B2 | 8/2009 | Sung et al. | |
| 7,590,183 B2 | 9/2009 | Yonge, III et al. | |
| 7,593,732 B2 | 9/2009 | Kim et al. | |
| 7,599,327 B2 | 10/2009 | Zhuang | |
| 7,613,104 B2 | 11/2009 | Bhatt et al. | |
| 7,623,439 B2 | 11/2009 | Webster et al. | |
| 7,660,279 B2 | 2/2010 | Brueck et al. | |
| 7,664,076 B2 | 2/2010 | Kim et al. | |
| 7,675,841 B2 | 3/2010 | Suh et al. | |
| 7,675,905 B2 | 3/2010 | Delaney et al. | |
| 7,693,517 B2 | 4/2010 | Etemad et al. | |
| 7,693,924 B2 | 4/2010 | Cho et al. | |
| 7,701,919 B2 | 4/2010 | Ah Lee | |
| 7,702,028 B2 | 4/2010 | Zhou et al. | |
| 7,706,824 B2 | 4/2010 | Schulist et al. | |
| 7,881,236 B2 | 2/2011 | Park et al. | |
| 7,961,696 B2 | 6/2011 | Ma et al. | |
| 7,995,967 B2 | 8/2011 | Li et al. | |
| 8,000,305 B2 | 8/2011 | Tan et al. | |
| 8,098,745 B2 | 1/2012 | Bertrand et al. | |
| 8,116,195 B2 | 2/2012 | Hou et al. | |
| 8,121,045 B2 | 2/2012 | Cai et al. | |
| 8,131,295 B2 | 3/2012 | Wang et al. | |
| 8,180,058 B2 | 5/2012 | Kitazoe | |
| 8,199,730 B2* | 6/2012 | Ou | H04L 1/1887 370/336 |
| 8,286,047 B2* | 10/2012 | Che | H04L 1/1845 714/751 |
| 8,340,232 B2 | 12/2012 | Ding et al. | |
| 8,406,179 B2* | 3/2013 | Kim | H04W 74/0866 455/450 |
| 8,422,410 B2 | 4/2013 | Park et al. | |
| 8,448,037 B2 | 5/2013 | Bergquist et al. | |
| 8,462,611 B2 | 6/2013 | Ma et al. | |
| 8,717,907 B2 | 5/2014 | Bergquist et al. | |
| 8,798,808 B2 | 8/2014 | Gatti et al. | |
| 8,953,562 B2 | 2/2015 | Bachl et al. | |
| 8,977,258 B2 | 3/2015 | Chou | |
| 9,094,202 B2 | 7/2015 | Maheshwari et al. | |
| 9,204,468 B2 | 12/2015 | Tynderfeldt et al. | |
| 9,215,731 B2 | 12/2015 | Kitzaoe et al. | |
| 9,444,650 B2 | 9/2016 | Muharemovic et al. | |
| 9,532,336 B2 | 12/2016 | Park et al. | |
| 9,775,177 B2 | 9/2017 | Park | |
| 10,517,120 B2 | 12/2019 | Park et al. | |
| 10,939,473 B2* | 3/2021 | Park | H04W 72/0406 |
| 2001/0004583 A1 | 6/2001 | Uchida | |
| 2002/0089957 A1 | 7/2002 | Viero | |
| 2004/0047284 A1 | 3/2004 | Eidson | |
| 2004/0066740 A1 | 4/2004 | Suh et al. | |
| 2004/0131106 A1 | 7/2004 | Kanterakis | |
| 2004/0185853 A1 | 9/2004 | Kim et al. | |
| 2005/0013381 A1 | 1/2005 | Suh et al. | |
| 2005/0041573 A1 | 2/2005 | Eom et al. | |
| 2005/0084030 A1 | 4/2005 | Zhou et al. | |
| 2005/0101328 A1 | 5/2005 | Son et al. | |
| 2005/0105460 A1 | 5/2005 | Suh et al. | |
| 2005/0117519 A1* | 6/2005 | Kwak | H04L 1/0025 370/329 |
| 2005/0259567 A1 | 11/2005 | Webster et al. | |
| 2006/0003767 A1 | 1/2006 | Kim et al. | |
| 2006/0018336 A1 | 1/2006 | Sutivong et al. | |
| 2006/0093052 A1 | 5/2006 | Cho et al. | |
| 2006/0126570 A1 | 6/2006 | Kim et al. | |
| 2006/0274843 A1 | 12/2006 | Koo et al. | |
| 2007/0042784 A1 | 2/2007 | Anderson | |
| 2007/0058595 A1 | 3/2007 | Classon et al. | |
| 2007/0110172 A1 | 5/2007 | Faulkner et al. | |
| 2007/0115871 A1 | 5/2007 | Zhang et al. | |
| 2007/0253465 A1 | 11/2007 | Muharemovic et al. | |
| 2007/0270273 A1 | 11/2007 | Fukuta et al. | |
| 2007/0291696 A1 | 12/2007 | Zhang et al. | |
| 2007/0291708 A1 | 12/2007 | Rao | |
| 2008/0059658 A1 | 3/2008 | Williams | |
| 2008/0095094 A1 | 4/2008 | Innami | |
| 2008/0165733 A1* | 7/2008 | Xiao | H04W 72/1231 455/509 |
| 2008/0186911 A1 | 8/2008 | Bachl et al. | |
| 2008/0192674 A1* | 8/2008 | Wang | H04L 1/1657 370/315 |
| 2008/0194243 A1* | 8/2008 | Jeong | H04W 74/0866 455/418 |
| 2008/0198800 A1 | 8/2008 | Zhang et al. | |
| 2008/0291880 A1 | 11/2008 | Nakada | |
| 2008/0305822 A1 | 12/2008 | Li et al. | |
| 2008/0318567 A1 | 12/2008 | Popovic et al. | |
| 2009/0052388 A1* | 2/2009 | Kim | H04W 74/0866 370/329 |
| 2009/0163211 A1 | 6/2009 | Kitazoe et al. | |
| 2009/0268693 A1 | 10/2009 | Lindh et al. | |
| 2010/0034162 A1 | 2/2010 | Ou et al. | |
| 2010/0037113 A1 | 2/2010 | Maheshwari et al. | |
| 2010/0113057 A1 | 5/2010 | Englund et al. | |
| 2010/0157916 A1* | 6/2010 | Kim | H04L 1/1671 370/329 |

(56) References Cited

U.S. PATENT DOCUMENTS

| | | | |
|---|---|---|---|
| 2010/0254356 A1 | 10/2010 | Tynderfeldt et al. | |
| 2011/0110240 A1 | 5/2011 | Bergquist et al. | |
| 2011/0176513 A1 | 7/2011 | Yi et al. | |

FOREIGN PATENT DOCUMENTS

| | | | |
|---|---|---|---|
| CN | 1183789 C | 1/2005 | |
| CN | 1596020 A | 3/2005 | |
| CN | 101184333 | 5/2008 | |
| CN | 100415028 C | 8/2008 | |
| CN | 100592648 C | 2/2010 | |
| DE | 50103757 | 10/2004 | |
| DE | 60310433 T2 | 11/2007 | |
| DE | 60220727 T2 | 3/2008 | |
| DE | 60336813 | 6/2011 | |
| DE | 602005018040 | 1/2020 | |
| DK | 2208291 T3 | 1/2017 | |
| EP | 1188344 B1 | 1/2004 | |
| EP | 1404079 | 3/2004 | |
| EP | 1469697 A2 | 10/2004 | |
| EP | 1748593 B1 | 12/2009 | |
| EP | 1794971 B1 | 3/2010 | |
| EP | 1519519 B1 | 4/2011 | |
| EP | 1787414 B1 | 1/2012 | |
| EP | 2223456 B1 | 9/2012 | |
| EP | 3537681 B1 | 10/2020 | |
| GB | 2357009 A | 6/2001 | |
| GB | 2461158 B | 3/2011 | |
| JP | 2008-103862 | 5/2008 | |
| JP | 2008-124800 A | 5/2008 | |
| JP | 4591973 B2 | 12/2010 | |
| KR | 10-2004-0029253 A | 4/2004 | |
| KR | 10-2006-0066595 | 6/2006 | |
| KR | 10-0597439 B1 | 7/2006 | |
| KR | 10-062668 | 9/2006 | |
| KR | 10-0626668 B1 | 9/2006 | |
| KR | 10-0651430 B1 | 11/2006 | |
| KR | 10-0657506 B1 | 12/2006 | |
| KR | 10-0665425 B1 | 1/2007 | |
| KR | 10-2007-0055004 | 5/2007 | |
| KR | 10-2007-0055845 | 5/2007 | |
| KR | 10-0735277 B1 | 7/2007 | |
| KR | 10-2007-0107619 | 11/2007 | |
| KR | 10-2008-0004025 | 1/2008 | |
| KR | 10-2008-0030941 | 4/2008 | |
| KR | 10-0868679 B1 | 11/2008 | |
| KR | 10-0918764 B1 | 9/2009 | |
| KR | 10-0930894 B1 | 12/2009 | |
| KR | 10-0938095 B1 | 1/2010 | |
| KR | 10-0939722 B1 | 2/2010 | |
| KR | 10-0946913 B1 | 3/2010 | |
| KR | 10-0950646 B1 | 4/2010 | |
| KR | 10-0965694 B1 | 6/2010 | |
| KR | 10-1221890 B1 | 1/2013 | |
| KR | 10-1596188 B1 | 2/2016 | |
| MY | 149225 A | 7/2013 | |
| PL | 2637318 T3 | 3/2015 | |
| TW | 200805910 A | 1/2008 | |
| WO | WO 00/79705 A1 | 12/2000 | |
| WO | WO 01/41471 | 6/2001 | |
| WO | WO 2004/030392 | 4/2004 | |
| WO | WO 2005/043791 | 5/2005 | |
| WO | WO 2005/055543 A1 | 6/2005 | |
| WO | WO 2005/088882 | 9/2005 | |
| WO | WO 2005/117314 A1 | 12/2005 | |
| WO | WO 2006/015108 A2 | 2/2006 | |
| WO | WO 2006/023536 | 3/2006 | |
| WO | WO 2006/123275 A1 | 11/2006 | |
| WO | WO 2007/082409 | 7/2007 | |
| WO | WO 2007/126301 | 11/2007 | |
| WO | WO 2007/138453 | 12/2007 | |
| WO | WO 2007/149509 A2 | 12/2007 | |
| WO | WO 2008/023932 | 2/2008 | |
| WO | WO 2008/041824 | 4/2008 | |
| WO | WO 2008/115110 A1 | 9/2008 | |
| WO | WO 2008/157839 | 12/2008 | |

OTHER PUBLICATIONS

U.S. Appl. No. 60/599,916, filed Aug. 10, 2004, Olfat et al.
U.S. Appl. No. 60/666,494, filed Mar. 30, 2005, Glasson et al.
U.S. Appl. No. 60/732,080, filed Oct. 31, 2005, Lee et al.
U.S. Appl. No. 60/759,697, filed Jan. 17, 2006, Tan et al.
U.S. Appl. No. 60/815,246, filed Jun. 19, 2006, Zhang et al.
U.S. Appl. No. 60/815,023, filed Jun. 20, 2006, Chandra et al.
U.S. Appl. No. 60/945,464, filed Jun. 21, 2007, Peyton.
U.S. Appl. No. 60/955,867, filed Aug. 14, 2007, Kitzaoe et al.
U.S. Appl. No. 60/015,159, filed Dec. 19, 2007, Kitazoe et al.
U.S. Appl. No. 61/087,307, filed Aug. 8, 2008, Meyian et al.
U.S. Appl. No. 61/087,988, filed Aug. 11, 2008, Yi et al.
U.S. Appl. No. 61/088,257, filed Aug. 12, 2008, Meylan et al.
3GPP FAQs "The Mobile Broadband Standard EDGE+" Available at http://www.3gpp.org/about3gpp/3gpp-faqs (retrieved Jun. 20, 2016); 11 pages.
3GPP FAQs "The Mobile Broadband Standard LTE-Advanced Pro" available at http://www.3gpp.org/about-3gpp/3gpp-faqs; 2016 (10 pages).
3GPP "The Mobile Broadband Standard HSPA: Delegates Corner" Release 14; May 23-27, 2016.
3GPP Meeting Registration; Meeting: RAN2 #62; Kansas City; May 5, 2008 (6 pages).
3GPP Meeting Registration; Meeting: 3GPPRAN1 #44; Mar. 10, 2016 (7 pages).
3GPP Meeting Registration; Meeting: 3GPPRAN1 #44-bis; Mar. 12, 2016 (6 pages).
3GPP Meeting Registration; Meeting: 3GPPRAN2 #62-bis; Mar. 12, 2016 (6 pages).
3GPP Ran 1 Meeting #44-bis "On the Performances of LTE RACH" Athens, Greece; Mar. 27-31, 2006; R1-060908; 6pages.
3GPP TSG-RAN Working Group 2 Meeting #52 "Intra-RAT Handover Access Procedure" Shanghai, China; May 8-12, 2006; R2-061229 (4 pages).
3GPP TSG RAN WG1 #44-bis "A New Preamble Shape for the Random Access Preamble in E-UTRA" Athens, Greece, Mar. 27-31, 2006; RI-060867; 5 pages.
3GPP TSG-RAN WG1 Meeting #44bis "Investigations on Random Access Channel Structure for E-UTRA Uplink" Athens, Greece; Mar. 27-31, 2006; R1-060992; 7 pages.
3GPP TSG RAN WG1 Ad Hoc on LTE "On Allocation of Uplink Pilot Sub-Channels in EUTRA SC-FDMA" London, UK; R1-050822; Aug. 29-Sep. 2, 2005; (7 pages).
3GPP TSG RAN WG1 Ad Hoc on LTE "On Uplink Pilot in EUTRA SC-FDMA" San Diego, USA; R1-051062; Oct. 10-14, 2005 (7 pages).
3GPP TSG-RAN WG2 "Access Procedure" Shanghai, China; R2-061201; May 8-12, 2006 (3 pages).
3GPP TSG-RAN WG2 #63 "NDI and Message 3" Jeju Island, Korea; Aug. 18-22, 2008; R2-084156; 5 pages.
3GPP TSG-RAN WG2 #63 "Handling of Received UL Grant in RA Procedure" Jeju, South Korea; Aug. 18-22, 2008; R2-084387; 3 pages.
3GPP Tsg-Ran WG3 #54 "Updates of Intra-LTE Handover in 36.300" Riga, Latvia Nov. 6-10, 2006; R3-061788; 6 pages.
3GPP TSG-RAN WG3 #54 "Updates of Intra-LTE Handover in 36.300" Riga, Latvia Nov. 6-10, 2006; R3-061945; 10 pages.
3GPP TSG RAN2 Meeting #63 "Handling of Received UL Grant in RA Procedure" Jeju, South Korea; Aug. 18-22, 2008; Marked-Up; R2-084388; 4 pages.
3GPP TSG RAN WG1 #42 on LTE "Orthogonal Pilot Channel in the Same Node B in Evolved UTRA Uplink" London, UK; R1-050851; Aug. 29-Sep. 2, 2005; (9 pages).
3GPP TSG RAN1 #43 "RACH Design for EUTRA" Helsinki, Finland; Jan. 23-25, 2006; R1-060025; 11 pages.
3GPP TSG RAN1 #44 "RACH Design for EUTRA" Denver, USA; R1-060387; Feb. 13-17, 2006 (11 pages).

(56) References Cited

OTHER PUBLICATIONS

3GPP TSG RAN1 #44 "RACH Design for EUTRA" Denver, USA; R1-060387; Marked-Up; Feb. 13-17, 2006 (11 pages).
3GPP TSG RAN WG1 #44 "Some Consideration for LTE Rach 13.2.3.1" Denver, USA; R1-060531; Feb. 13-17, 2006 (4 pages).
3GPP TSG WG1 Meeting #44bis "RACK Design for E-UTRA" R1-060797; Athens, Greece, Mar. 27-31, 2006 (9 pages).
3GPP TSG RAN1 #44-bis "Random Access Sequence Design" R1-060884; Athens, Greece, Mar. 24-26, 2006 (7 pages).
3GPP TSG-RAN WG3 #48 bis meeting "On Intra-Access Mobility for LTE_Active UEs" Cannes, France; R3-051108; Oct. 11-14, 2005 (4 pages).
3GPP TSG-RAN WG2 #50 "Intra-System Mobility" Sophia-Antipolis, France; R2-060013; Jan. 9-13, 2006 (7 pages).
3GPP TSG RAN WG2 #52 "Mobility in LTE Active" Athens, Greece; Tdoc R2-060915; Mar. 27-31, 2006 (4 pages).
3GPP TSG-RAN WG2 Meeting #53 "Cell Switching in LTE_ Active State" Shanghai, China; R2-061196; May 8-12, 2006 (5 pages).
3GPP TSG-RAN WG1 Meeting #53 "UL Grant for Random Access Message 3" R1-082078; Kansas City, USA; May 5-9, 2008 (4 pages).
3GPP TSG-RAN WG2 Meeting #53 "Intra-LTE Handover Operation" Shanghai, PRC; R2-061135; May 8-13, 2006 (3 pages).
3GPP Tsg-Ran WG3 #53bis "Intral-LTE Mobility Procedure" Seoul, Korea; R3-061489; Oct. IQ-13, 2006 (4 pages).
3GPP TSG RAN WG2 #57 "Uplink Synchronization" R2-070781; St. Louis, USA; Feb. 12-16, 2007 (3 pages).
3GPP TSG-RAN WG2 #61 bis "Control of HARQ for RACH message 3" R2-081764; Shenzhen, China; Mar. 31-Apr. 4, 2008 (5 pages).
3GPP TSG-RAN WG2 #62 "Update of MAC Random Access Procedure" Tdoc R2-082731; Kansas City, USA; May 5-9, 2008 (7 pages).
3GPP TSG-RAN2 Meeting #62bis "Clarification of DL- and UL-SCH Data Transfer" Warsaw, Poland, R2-083400; Marked-Up; Jun. 30-Jul. 4, 2008 (7 pages).
3GPP TSG-RAN2 Meeting #62bis "Clarification of DL- and UL-SCH Data Transfer" Warsaw, Poland, R2-083701 (revision of R2-083400); Marked-Up; Jun. 30-Jul. 4, 2008 (8 pages).
3GPP TSG-RAN2 Meeting #62bis "NDI and Msg3" Warsaw, Poland, R2-083703; Marked-Up; Jun. 30-Jul. 4, 2008 (3 pages).
3GPP TSG-RAN2 Meeting #63 "Corrections Relating to RACH Partitioning" Jeju, Korea; R2-084788; Aug. 18-22, 2008; (4 pages).
3GPP TSG-RAN2 Meeting #59bis "E-UTRA RRC TP Capturing Current Status on Mobility" Shanghai, P.R. China; Oct. 8-12, 2007; R2-074014 (11 pages).
3GPP TSG-RAN WG2 #63 "PCCH Configuration in SIB1" Jeju, Korea; R2-083882; Aug. 18-22, 2008; (4 pages).
3GPP TSG-RAN WG2 Meeting #64bis "Clarification on RA Preambles" Athens, Greece; R2-091523; Jan. 9-13, 2009 (3 pages).
3GPP TSG-RAN WG2 Meeting #64bis "Clarification on RA Preambles" Athens, Greece; R2-091523; Marked-Up; Jan. 9-13, 2009 (3 pages).
3GPP TS 25.201 V3.0.0 (Oct. 1999) "3rd Generation Partnership Project; Technical Specification Group Radio Access Network; Physical Layer—General Description (3G TS 25.201 Version 3.0. 0)" Oct. 1999; 13 pages.
3GPP TS 25.211 V6.6.0 (Sep. 2005) "3rd Generation Partnership Project; Technical Specification Group Radio Access Network; Physical Channels and Mapping of Transport Channels onto Physical Channels (FDD) (Release 6)" Sep. 2005; 50 pages.
3GPP TS 25.211 V6.7.0 (Dec. 2005) "3rd Generation Partnership Project; Technical Specification Group Radio Access Network; Physical Channels and Mapping of Transport Channels onto Physical Channels (FDD) (Release 6)" Dec. 2005; 50 pages.
3GPP TS 25.213 V6.4.0 (Sep. 2005) "3rd Generation Partnership Project; Technical Specification Group Radio Access Network; Spreading and Modulation (FDD) (Release 6)" Sep. 2005; 32 pages.
3GPP TS 25.214 V5.11.0 (Jun. 2005); Release 5; Jun. 2005 (50 pages).
3GPP TS 25.302 V6.5.0 "3rd Generation Partnership Project; Technical Specification Group Radio Access Network; Services Provided by the Physical Layer (Release 6)" Sep. 2005 (75 pages).
3GPP TR 21.900 V8.2.0 (Mar. 2008) "3rd Generation Partnership Project; Technical Specification Group Services and System Aspects; Technical Specification Group Working Methods (Release 8)" Mar. 2008; 34 pages.
3GPP TR 25.813 V0.0.2 "3rd Generation Partnership Project; Technical Specification Group Radio Access Network; Evolved Universal Terrestrial Radio Access (UTRA) and Universal Terrestrial Radio Access Network (UTRAN); Radio Interface Protocol Aspects (Release 7)"; Oct. 2005 (17 pages).
3GPP TR 25.813 V0.0.2 "3rd Generation Partnership Project; Technical Specification Group Radio Access Network; Evolved Universal Terrestrial Radio Access (UTRA) and Universal Terrestrial Radio Access Network (UTRAN); Radio Interface Protocol Aspects (Release 7)"—Marked-Up; Oct. 2005 (18 pages).
3GPP TR 25.814 V0.3.1 "3rd Generation Partnership Project; Technical Specification Group Radio Access Network; Physical Layer Aspects for Evolved UTRA (Release 7)" Oct. 2005 (51 pages).
3GPP TR 25.814 V1.0.2 (Jan. 2006) "3rd Generation Partnership Project; Technical Specification Group Radio Access Network; Physical Layer Aspects for Evolved UTRA (Release 7)" Marked-Up; Jan. 2006; 79 pages.
3GPP TR 25.905 V7.0.0 (DEc. 2006) "3rd Generation Partnership Project; Technical Specification Group Radio Access Network; Improvement of the Multimedia Broadcast Multicast Service (MBMS) in UTRAN (Release 7)" Dec. 2006; 41 pages.
3GPP TR 25.912 V7.0.0 "3rd Generation Partnership Project; Technical Specification Group Radio Access Network; Feasibility Study for Evolved Universal Terrestrial Radio Access (UTRA) and Universal Terrestrial Radio Access Network (E-UTRAN) (Release 7)" Jun. 2006 (55 pages).
3GPP TS 36.101 V8.2.0 (May 2008) "3rd Generation Partnership Project; Technical Specification Group Radio Access Network; Evolved Universal Terrestrial Radio Access (E-UTRA); User Equipment (UE) Radio Transmission and Reception (Release 8)" May 2008; 66 pages.
3GPP TS 36.211 V8.0.0 (Sep. 2007) "3rd Generation Partnership Project; Technical Specification Group Radio Access Network; Evolved Universal Terrestrial Radio Access (E-UTRA); Physical Channels and Modulation (Release 8)" Sep. 2007; 50 pages.
3GPP TS 36.213 V8.3.0 (May 2008) "3rd Generation Partnership Project; Technical Specification Group Radio Access Network; Evolved Universal Terrestrial Radio Access (E-UTRA): Physical Layer Procedures (Release 8)" May 2008; 45 pages.
3GPP Specification Detail (3GPP TS 36.300) "Evolved Universal Terrestrial Radio Access (E-UTRA) and Evolved Universal Terrestrial Radio Access Network (E-UTRAN); Overall Description; Stage 2" Printout of http://www.3gpp.org/DynaReport/36300.htm; Mar. 21, 2016.
3GPP TS 36.300 V8.0.0 (Mar. 2007) "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)" Mar. 2007; 82 pages.
3GPP TS 36.300 V8.1.0 (Jun. 2007) "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)" Jun. 2007 (106 pages).
3GPP TS 36.300 V8.2.0 (Sep. 2007) "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)" Sep. 2007; 109 pages.
3GPP TS 36.300 V8.3.0 (Dec. 2007) "3rd Generation Partnership Project; Technical Specification Group Radio Access Network; Evolved Universal Terrestrial Radio Access (E-UTRA) and Evolved

(56) References Cited

OTHER PUBLICATIONS

Universal Terrestrial Radio Access Network (E-UTRAN); Overall Description; Stage 2 (Release 8)" Dec. 2007; 121 pages.
3GPP TS 36.300 V8.4.0 (Mar. 2008) "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)" Mar. 2008; 126 pages.
3GPP TS 36.300 V8.5.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)" May 2008 (134 pages).
3GPP TS 36.300 V8.6.0 (Sep. 2008) "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)" Sep. 2008 (137 pages).
3GPP TS 36.300 V8.7.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)" Dec. 2008 (144 pages).
3GPP TS 36.300 V8.8.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)" Mar. 2009 (156 pages).
3GPP TS 36.300 V8.9.0 (Jun. 2009) "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)" Jun. 2009 (159 pages).
3GPP TS 36.300 V0.9.0 (Marked-Up) "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2" Mar. 2007 (87 pages).
3GPP TS 36.300 V0.9.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2" Mar. 2007 (81 pages).
3GPP TS 36.321 "3GPP The Mobile Broadband Standard GPRS: Evolved Universal Terrestrial Radio Access (E-UTRA); Medium Access Control (MAC) Protocol Specification" Available at http://www.3gpp.org/DynaReport/ 36321.htm; Mar. 17, 2016.
3GPP TS 36.321 "3GPP The Mobile Broadband Standard EDGE+: Evolved Universal Terrestrial Radio Access (E-UTRA_; Medium Access Control (MAC) Protocol Specification" Available at http://www.3gpp.org/DynaReport/36321.htm; retrieved Jun. 20, 2016; (3 pages).
3GPP TS 36.321 "3GPP Specification Detail: Evolved Universal Terrestrial Radio Access (E-UTRA); Medium Acces Control (MAC) Protocol Specification" Wayback Machine—May 5, 2008; https://web.archive.org/web/20080505041953/http://www.3gpp.org/ftp/Specs/htmlinfo/36321.htm (retrieved Jun. 20, 2016).
3GPP TS 36.321 V8.1.0. "3rd Generation Partnership Project; Technical Specification Group Access Network; Evolved Universal Terrestrial Radio Access (E-UTRA) Medium Access Control (MAC) protocol specification" (Release 8) 30 pages, Mar. 2008.
3GPP TS 36.321 V8.2.0. "3rd Generation Partnership Project; Technical Specification Group Access Network; Evolved Universal Terrestrial Radio Access (E-UTRA) Medium Access Control (MAC) protocol specification" (Release 8) pp. 1-33, May 2008.
3GPP TS 36.321 V8.2.0 "3rd Generation Partnership Project; Technical Specification Group Radio Access Network; Evolved Universal Terrestrial Radio Access (E-UTRA) Medium Access Control (MAC) Protocol Specification (Release 8)" May 2008 (33 pages).

3GPP TS 36.321 V8.3.0 "3rd Generation Partnership Project; Technical Specification Group Radio Access Network; Evolved Universal Terrestrial Radio Access (E-UTRA) Medium Access Control (MAC) Protocol Specification (Release 8)" Sep. 2008 (36 pages).
3GPP TS 36.321 V8.6.0 "3rd Generation Partnership Project; Technical Specification Group Radio Access Network; Evolved Universal Terrestrial Radio Access (E-UTRA) Medium Access Control (MAC) Protocol Specification (Release 8)" Jun. 2009 (47 pages).
3GPP TS 36.331 V8.0.0 (Dec. 2007) "3rd Generation Partnership Project; Technical Specification Group Radio Access Network; Evolved Universal Terrestrial Radio Access (E-UTRA) Radio Resource Control (RRC); Protocol Specification (Release 8)" Dec. 2007 (56 pages).
3GPP TS 36.331 V8.1.0 (Mar. 2008) "3rd Generation Partnership Project; Technical Specification Group Radio Access Network; Evolved Universal Terrestrial Radio Access (E-UTRA) Radio Resource Control (RRC); Protocol Specification (Release 8)" Mar. 2008 (122 pages).
3GPP TS 36.331 V8.2.0 (May 2008) "3rd Generation Partnership Project; Technical Specification Group Radio Access Network; Evolved Universal Terrestrial Radio Access (E-UTRA) Radio Resource Control (RRC); Protocol Specification (Release 8)" May 2008 (151 pages).
3GPP TS 36.331 V8.3.0 (Sep. 2008) "3rd Generation Partnership Project; Technical Specification Group Radio Access Network; Evolved Universal Terrestrial Radio Access (E-UTRA) Radio Resource Control (RRC); Protocol Specification (Release 8)" Sep. 2008 (178 pages).
3GPP TS 36.331 V8.4.0 (Dec. 2008) "3rd Generation Partnership Project; Technical Specification Group Radio Access Network; Evolved Universal Terrestrial Radio Access (E-UTRA) Radio Resource Control (RRC); Protocol Specification (Release 8)" Dec. 2008 (198 pages).
3GPP TS 36.331 V8.5.0 (Mar. 2009) "3rd Generation Partnership Project; Technical Specification Group Radio Access Network; Evolved Universal Terrestrial Radio Access (E-UTRA) Radio Resource Control (RRC); Protocol Specification (Release 8)" Mar. 2009 (204 pages).
3GPP TS 36.331 V8.6.0 (Jun. 2009) "3rd Generation Partnership Project; Technical Specification Group Radio Access Network; Evolved Universal Terrestrial Radio Access (E-UTRA) Radio Resource Control (RRC); Protocol Specification (Release 8)" Jun. 2009 (207 pages).
3rd Generation Partnership Project (3GPP) "Enforcing New Transmission After Flushing HARQ Process" pp. 1-6, Feb. 9-13, 2009, Athens, Greece, XP050323002.
Abramson, Norman "The Aloha System—Another Alternative for Computer Communications" University of Hawaii; Honolulu, Hawaii; Fall Joint Computer Conference, 1970; 6 pages.
Bucknell, Paul e-mail re "[RAN2#61bis] Philips/NXP Semiconductors Contributions on LTE" 3GPP_TST_RAN_WG2@LIST.ETSi.ORG Archives; Mar. 25, 2008; 8 pages.
Chu, David C. "Polyphase Codes with Good Periodic Correlation Properties" Information Theory IEEE Transaction on, vol. 18, issue 4, pp. 531-532, Jul. 1972).
Dahlman, Erik "3G Evolution HSPA and LTE For Mobile Broadband" Academic Press; 2007; 18 pages.
Dahlman, Erik "3G Evolution HSPA and LTE For Mobile Broadband" Academic Press; 2017; 486 pages.
Ericsson "Clarification of DL- and UL-SCH Data Transfer" 3GPP TSG-RAN2 Meeting #62bis; R2-083727; Warsaw, Poland; Jun. 30-Jul. 4, 2008 (7 pages).
ETSI TS 101 475 V1.3.1 "Broadband Radio Access Networks (BRAN); Hiperlan Type 2; Physical (PHY) Layer" Dec. 2001 (43 pages).
ETSI TS 101 761-1 V1.3.1 "Broadband Radio Access Networks (BRAN); Hiperlan Type 2; Data Link Control (DLC) Layer; Part 1: Basic Data Transport Functions" Dec. 2001 (88 pages).
ETSI TS 136 321 V8.2.0 "LTE; Evolved Universal Terrestrial Radio Access (E-UTRA); Medium Access Control (MAC) Protocol Specification (3GPP TS 36.321 Version 8.2.0 Release 8)" Nov. 2008 (35 pages).

(56) References Cited

OTHER PUBLICATIONS

Holma, Harri et al. "WCDMA For UMTS: Radio Access for Third Generation Mobile Communications" 3rd Edition; Wiley; 2004; 481 pages.
IEEE "Minutes of IEEE 802.16 Session #38" IEEE 802.16 Broadband Wireless Acess Working Group; Aug. 25, 2005 (44 pages).
IEEE "Draft IEEE Standard for Local and Metropolitan Area Networks: Part 16: Air Interface for Fixed and Mobile Broadband Wireless Access Systems" IEEE P802.16e/D12, Oct. 14, 2005 (684 Pages).
IEEE "IEEE Standard for Local and Metropolitan Area Networks: Part 16: Air Interface for Fixed and Mobile Broadband Wireless Access Systems; Amendment 2: Physical and Medium Access Control Layers for Combined Fixed and Mobile Operation in Licensed Bands" IEEE P802. 16e—2005; Feb. 28, 2006 (864 Pages).
IEEE "IEEE 802.16e Handoff Draft" IEEE C802.16e-03/20rl; Mar. 13, 2003 (22 pages).
IEEE "IEEE 802.16 Standard for Local and Metropolitan Area Networks: Part 16: Air Interface for Fixed Broadband Wireless Access Systems" Oct. 1, 2004 (895 pages).
IEEE "Signaling Methodologies to Support Closed-Loop Transmit Processing in TDD-OFDMA" IEEE C802.16e-04/103r2; Jul. 7, 2004 (35 pages).
Joint RAN2-RAN3 #48bis LTE "EUTRAN Handover Procedure for LTE_Active" Cannes, France; TSGR3(05)1106; Oct. 11-14, 2005 (3 pages).
Krause, Joern Email re "RAN2 LTE specs" 3GPP_TSG_RAN_WG2@LIST.ETSI.ORG Archives; Mar. 11, 2008 (8 pages).
Krause, Joern Email re "Set 1 (13 of 27 specs) of new RAN2 Specifications Now Available in Final Specs Folder" 3gpp_TST_RAN_WG2@LIST.ETSI.ORG Archives; Jun. 15, 2008.
LG Electronics "Corrections to the Random Access Response Reception" 3GPP TSG-RAN WG2 #62, R2-082447; Kansas City, US, May 5-9, 2008.
Natarajan, Balasubramaniam et al. "High-Performance MC-CDMA Via Carrier Interferometry Codes" IEEE Transactions on Vehicular Technology, Vo. 60, No. 6, Nov. 2001; 10 pages.
Nuaymi, Loutfi "WiMAX: Technology for Broadband Wireless Access" John Wiley & Sons, Ltd., 2007 (286 pages).
Popovic, Branislav M. "Generalized Chirp-Like Polyphase Sequences with Optimum Correlation Properties" IEEE Transactions on Information Theory, vol. 38, No. 4. Jul. 1992 (4 pages).
Printout of http://www.3gpp.org/ftp/Specs/ archive/36_series/36.300/; Jul. 5, 2006-Jan. 11, 2016 (2 pages).
Printout of http://www.3gpp.org/ftp/ Specs/archive/36_series/36.321/; Jan. 14, 2016 (2 pages).
Printout of http://www.3gpp.org/ftp/tsg_ran/WG2_RL2/TS GR2_63/Docs/; Jul. 18, 2008-Mar. 23, 2016; 18 pages.
Printout of http://www.3gpp.org/ftp/tsg_ran/WG2_RL2/TSGR2_61bis/Docs/; Mar. 19-Apr. 29, 2008; (11 pages).
Printout of archived version of 3GPP Frequently Asked Questions, available at https://web.archive.org/web/20080611055805/ht tp://www.3gpp.org/faq/faq_2005_2.htm; Jul. 20, 2006 (11 pages).
Printout of list of attendees at 3GPP TSG RAN WG2 Meeting 61 bis; Date Unknown; (3 pages).
Printout of List of Tdocs submitted for 3GPP TSG RAN WG2 Meeting 61 bis; Apr. 4, 2008; (31 pages).
Sesia, Stefania "LTE: The UMTS Long Term Evolution: From Theory to Practice" Second Edition; Wiley; 2011 (794 pages).
Tsai, Shang Ho et al. "MAI-Free MC-CDMA Systems Based on Hadamard-Walsh Codes" IEEE Transactions on Signal Processing, vol. 54, No. 8, Aug. 2006 (14 pages).
TSG-RAN Working Group 1 Meeting #6 "Proposal for RACH Preambles" Espoo, Finland; Jul. 13-16, 1999; 3GPP/TSGR1#6(99)893; 26 pages.
TSG-RAN Meeting #41 "REL-8 CRs for LTE to TS 36.321 MAC" Kobe, Japan; RP-080690; Sep. 9-12, 2008; (3 pages).
TSG-RAN WG1 #43 E-UTRA Random Access: Seoul, Korea; Nov. 7-11, 2005; R1-051445; 4 pages.
TSG-RAN Meeting # 43 "RAN2 REL-8 CRs for LTE to TS 36.300" Biarritz, France; RP-090123; Mar. 3-6, 2009 (1 page).
TSG-RAN WG1 Meeting #44 "RACH Preamble Evaluation in E-UTRA Uplink" Denver, USA; R1-060700; Feb. 13-17, 2006 (5 pages).
TSG-RAN WG1 Meeting #44bis "Random Access Burst Evaluation in E-UTRA Uplink" Athens, Greece; R1-060792; Mar. 27-31, 2006 (8 pages).
TSG-RAN WG1 Meeting #45 "Random Access Design for E-UTRA Uplink" Shanghai, China; R1-061114; May 8-12, 2006 (6 pages).
TSG-RAN WG1 Meeting #45 "Random Access Design for E-UTRA Uplink" Shanghai, China; R1-061114; Marked-Up; May 8-12, 2006 (5 pages).
TSG-RAN WG1 #46 "E-UTRA Scalability of Random Access Preamble with Cyclic Prefix" Tallinn, Estonia; R1-062274; Aug. 28-Sep. 1, 2006 (8 pages).
TSG-RAN Working Group 2 Meeting # 62 "Report of 3GPP TSG RAN WG2 meeting #61 bis" R2-082800; Shenzhen, China, Mar. 31-Apr. 4, 2008; (135 pages).
TSG-RAN Working Group 1 Meeting #63bis "Report of 3GPP TSG RAN WG2 Meeting #63" Prague, Czech Republic; Oct. 18-22, 2008; R2-085971; 156 pages.
Van Den Brand, J.W. et al. "Streaming Consistency: A Model for Efficient MPSoC Design" IEEE Computer Society; 10th Euromicro Conference on Digital System Design Architectures, Methods and Tools; Aug. 2007.
Webster'S New World College Dictionary; Third Edition; Definition of "If"; 1997.
Wu, Yik-Chung et al. "Maximum-Likelihood Symbol Synchronization for IEEE 802.11a WLANs in Unknown Frequency-Selective Fading Channels" IEEE Transactions on Wireless Communications, vol. 4, No. 6, Nov. 2005 (13 pages).
Examination Report for Great Britain Patent Application No. GB0912850.5, dated Aug. 20, 2009.
Official Action for Great Britain Patent Application No. GB0912850.5, dated Jan. 8, 2010.
Official Action for Great Britain Patent Application No. GB0912850.5, dated Jun. 7, 2010.
Official Action for Great Britain Patent Application No. GB0912850.5, dated Jul. 21, 2010.
Notification of Grant for Great Britain Patent Application No. GB0912850.5, dated Dec. 7, 2010.
Prior Art Search Report (including translation) for Korean Application No. 10-2009-0057128, mailed Oct. 27, 2009.
Decision to Grant for Korean Application No. 10-2009-0057128, dated Jan. 11, 2010.
International Search Report for corresponding International Application No. PCT/KR2009/004002, dated Mar. 9, 2010.
Written Opinion for corresponding International Application No. PCT/KR2009/004002, dated Mar. 9, 2010.
International Preliminary Report on Patentability for corresponding International Application No. PCT/KR2009/004002, dated Feb. 24, 2011.
Office Action for Canadian Patent Application No. 2,720,833, dated Jun. 12, 2012.
Notice of Allowance for Canadian Patent Application No. 2,720,833, dated Aug. 8, 2013.
Office Action for Chinese Patent Application No. 200980120004.0, dated Mar. 5, 2013.
Office Action for Chinese Patent Application No. 200980120004.0, dated Nov. 21, 2013.
Office Action (including translation) for Chinese Patent Application No. 200980120004.0, dated May 28, 2014.
Notification on the Grant of Patent Right for Invention (including translation) for Chinese Patent Application No. 200980120004.0, dated Sep. 4, 2014.
Invalidation Request (including translation) for Chinese Patent Application No. 209980120004.0, dated Jan. 30, 2018.
Observation (including translation) for Chinese Patent Application No. 200980120004.0, dated Feb. 28, 2018.
Examination Decision on Request for Invalidation (Including Translation) for Chinese Patent Application No. 200980126004.0, dated Oct. 11, 2018.

(56) References Cited

OTHER PUBLICATIONS

First Office Action (Including Translation) for Chinese Patent Application No. 201410612502.X, dated Jun. 27, 2017.
Notification on the Grant of Patent Right for Invention (Including Translation) for Chinese Patent Application No. 201410612502.X, dated Feb. 12, 2018.
European Search Report for European Patent Application No. 09166620.6, dated Nov. 27, 2009.
Office Action for European Patent Application No. 09166620.6, dated Jan. 19, 2010.
Communication Under Rule 71(3) EPC for European Patent Application No. 09166620.6, dated Mar. 8, 2016.
European Search Report for European Patent Application No. 16020306.3, dated Sep. 15, 2016.
Intention to Grant for European Patent Application No. 16020306.3, dated Jun. 2, 2017.
European Search Report for European Patent Application No. 17199914.7, dated May 7, 2018.
Intent to Grant for European Patent Application No. 17199914.7, dated Aug. 20, 2018.
Official Action for U.S. Appl. No. 12/538,514, dated Jun. 11, 2010.
Notice of Allowance for U.S. Appl. No. 12/538,514, dated Sep. 20, 2010.
Notice of Allowance for U.S. Appl. No. 12/972,366, dated Dec. 14, 2012.
Official Action for U.S. Appl. No. 13/801,529 dated Feb. 3, 2015.
Official Action for U.S. Appl. No. 13/801,529 dated Oct. 16, 2015.
Official Action (Ex Parte Quayle Action) for U.S. Appl. No. 13/801,529 dated Apr. 8, 2016.
Notice of Allowance for U.S. Appl. No. 13/801,529 dated Jul. 18, 2016.
Office Action for U.S. Appl. No. 15/294,351 dated Dec. 2, 2016.
Notice of Allowance for U.S. Appl. No. 15/294,351 dated Mar. 6, 2017.
Office Action for U.S. Appl. No. 15/664,686, dated Jun. 11, 2019.
Notice of Allowance for U.S. Appl. No. 15/664,686, dated Sep. 5, 2019.
Office Action for U.S. Appl. No. 16/723,514, dated Sep. 2, 2020.
Notice of Allowance for U.S. Appl. No. 16/723,514, dated Dec. 11, 2020.
Defendants' Initial Invalidity Contentions; In the United States District Court for the District of Delaware; Civil Action Nos. 1:15-cv-00542-SLR-SRF; 1:15-cv-00543-SLR-SRF; 1:15-cv-00544-SLR-SRF; 1:15-cv-00545-SLR-SRF; 1:15-cv-00546-SLR-SRF; 1:15-cv-00547-SLR-SRF; filed Mar. 14, 2016 (1244 pages).
Defendants' Invalidity Contentions; In the United States District Court for the District of Delaware; Civil Action Nos. 1:15-cv-00542-SLR-SRF; 1:15-cv-00543-SLR-SRF; 1:15-cv-00544-SLR-SRF; 1:15-cv-00545-SLR-SRF; 1:15-cv-00546-SLR-SRF; 1:15-cv-00547-SLR-SRF; filed Feb. 28, 2017 (3,140 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Jun. 25, 2015-May 13, 2016 Docket Nos. 1-53; (1259 pages) .
Documents filed with U.S. District Court Proceedings for *Evolved Wireless, LLC* v. *Apple Inc.*; U.S. District Court, forthe District of Delaware (Wilmington); Civil Action No. 1:15-cv-00542-SLR-SRF; Includes documents filed from May 17, 2016-Jul. 11, 2016— Docket Nos. 54-67; (4,028 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Jul. 15, 2016-Aug. 19, 2016— Docket Nos. 68-76; (308 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Aug. 23, 2016-Nov. 8, 2016 Docket Nos. 77-108; (785 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Nov. 9, 2016-Dec. 12, 2016; Docket Nos. 109-119; (212 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Dec. 27, 2016-Jan. 17, 2017; Docket Nos. 120-122; (9 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Jan. 25, 2017-Mar. 17, 2017: Docket Nos. 123-145; (176 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Mar. 20, 2017-May 30, 2017; Docket Nos. 146-157; (175 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Jun. 14, 2017-Aug. 25, 2017; Docket Nos. 158-189; (257 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Aug. 31, 2017-Oct. 5, 2017; Docket Nos. 190-219; (307 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Oct. 6, 2017-Jan. 3, 2018; Docket Nos. 220-308; (5,058 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Jan. 5, 2018-Apr. 16, 2018; Docket Nos. 309-379; (1198 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Apr. 23, 2018-Jun. 28, 2018; Docket Nos. 380-392; (205 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Jul. 10, 2018-Aug. 24, 2018; Docket Nos. 393-408; (91 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Sep. 21, 2018-Oct. 3, 2018; Docket Nos. 409-432; (349 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Dec. 31, 2018-Mar. 28, 2019; Docket Nos. 433-510; (2342 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Apr. 2, 2019-Jun. 7, 2019; Docket Nos. 511-537; (233 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed from Jun. 13, 2019-Aug. 9, 2019; Docket Nos. 538-545; (105 pages).
Documents filed with U.S. District Court Proceedings for *Evolved Wireless, LLC* v. *Apple Inc.*; U.S. District Court, for the District of

(56) References Cited

OTHER PUBLICATIONS

Delaware (Wilmington); Civil Action No. 1:15-cv-00542-SLR-SRF; Includes documents filed from Aug. 30, 2019-Sep. 5, 2019; Docket Nos. 546-548; (6 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; includes documents filed from Nov. 15, 2019-Dec. 17. 2019; Docket Nos. 549-552; (31 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents filed on Jun. 23, 2020; Docket No. 553; (2 pages).
Documents filed with U.S. District Court Proceedings for *Evolved Wireless, LLC* v. *Apple Inc.*; U.S. District Court, for the District of Delaware (Wilmington); Civil Action No. 1:15-cv-00542-SLR-SRF; Includes documents on Jul. 20, 2021; Docket No. 554-557; (4 pages).
Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from Jun. 25, 2015-May 13, 2016 Docket Nos. 1-54; (1369 pages).
Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from May 17, 2016-Jul. 11, 2016—Docket Nos. 55-69; (4,029 pages).
Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from Jul. 15, 2016-Aug. 19, 2016—Docket Nos. 70-81; (336 pages).
Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from Aug. 23, 2016-Nov. 8, 2016; Docket Nos. 82-114; (702 pages).
Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from Nov. 9, 2016-Dec. 7, 2016; Docket Nos. 115-125; (212 pages).
Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from Dec. 27, 2016-Jan. 17, 2017; Docket Nos. 126-129; (11 pages).
Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from Jan. 25, 2017-Mar. 17, 2017; Docket Nos. 130-151; (161 pages).
Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from March 22, 2017-May 30, 2017; Docket Nos. 152-163; (172 pages).
Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from Jun. 5, 2017-Aug. 29, 2017; Docket Nos. 164-202; (281 pages).
Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF: Includes documents filed from Aug. 31, 2017-Oct. 5, 2017; Docket Nos. 203-232; (352 pages).
Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; includes documents filed from Oct. 16, 2017-Jan. 3, 2018; Docket Nos. 233-308; (3,907 pages).
Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from Jan. 5, 2018-Apr. 16, 2018; Docket Nos. 309-372; (3,169 pages).
Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from Apr. 23, 2018-Jun. 28, 2018; Docket Nos. 373-383; (156 pages).
Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; includes documents filed from Jul. 24, 2018-Aug. 24, 2018; Docket Nos. 384-402; (139 pages).
Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; includes documents filed from Sep. 4, 2018-Oct. 3, 2018; Docket Nos. 403-408; (60 pages).
Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from Dec. 31, 2018-Mar. 28, 2019; Docket Nos. 409-428; (154 pages).
Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed on May 1, 2019; Docket No. 429; (3 pages).
Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from Jun. 13, 2019-Aug. 14, 2019; Docket Nos. 430-431; (10 pages).
Documents filed with U.S. District Court Proceedings for *Evolved Wireless, LLC* v. *HTC Corporation et al.*: U.S. District Court, for the District of Delaware (Wilmington); Civil Action No. 1:15-cv-00543-SLR-SRF; Includes documents filed from Aug. 29, 2019-Oct. 11, 2019; Docket Nos. 432-435; (17 pages).
Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from Nov. 1, 2019-Jan. 8, 2020; Docket Nos. 436-448; (63 pages).
Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; includes documents on Sep. 3, 2020; Docket No. 449; (643 pages).
Documents filed with U.S. District Court Proceedings for *Evolved Wireless, LLC* v. *HTC Corporation et al.*; U.S. District Court, for the District of Delaware (Wilmington); Civil Action No. 1:15-cv-00543-SLR-SRF; Includes documents filed from Mar. 4, 2021-Apr. 15, 2021; Docket Nos. 450-453; (25 pages).
Documents filed with U.S. District Court Proceedings for *Evolved Wireless, LLC* v. *Lenovo Group Ltd., et al..*; U.S. District Court, for the District of Delaware (Wilmington); Civil Action No. 1:15-cv-00544-SLR-SRF; Includes documents filed from Jun. 25, 2015-May 13, 2016 Docket Nos. 1-48; (993 pages).
Documents filed with U.S. District Court Proceedings for *Evolved Wireless, LLC* v. *Lenovo Group Ltd., et al..*; U.S. District Court, for the District of Delaware (Wilmington); Civil Action No. 1:15-cv-00544-SLR-SRF; includes documents filed from May 17, 2016-Jul. 11, 2016; Docket Nos. 49-61; (4,026 pages).
Documents filed with U.S. District Court Proceedings for *Evolved Wireless, LLC* v. *Lenovo Group Ltd., et al..*; U.S. District Court, for the District of Delaware (Wilmington); Civil Action No. 1:15-cv-

(56) References Cited

OTHER PUBLICATIONS

00544-SLR-SRF; includes documents filed from Jul. 15, 2016-Aug. 19, 2016; Docket Nos. 62-71; (310 pages).
Documents filed with U.S. District Court Proceedings for *Evolved Wireless, LLC* v. *Lenovo Group Ltd., et al..*; U.S. District Court, for the District of Delaware (Wilmington); Civil Action No. 1:15-cv-00544-SLR-SRF; Includes documents filed from Aug. 23, 2016-Nov. 8, 2016; Docket Nos. 72-102; (740 pages).
Documents filed with U.S. District Court Proceedings for *Evolved Wireless, LLC* v. *Lenovo Group Ltd., et al..*; U.S. District Court, for the District of Delaware (Wilmington); Civil Action No. 1:15-cv-00544-SLR-SRF; Includes documents filed from Nov. 9, 2016-Dec. 7, 2016; Docket Nos. 103-113; (212 pages).
Documents filed with U.S. District Court Proceedings for *Evolved Wireless, LLC* v. *Lenovo Group Ltd., et al..*; U.S. District Court, for the District of Delaware (Wilmington); Civil Action No. 1:15-cv-00544-SLR-SRF; Includes documents filed from Dec. 27, 2016-Jan. 23, 2017; Docket Nos. 114-117; (11 pages).
Documents filed with U.S. District Court Proceedings for *Evolved Wireless, LLC* v. *Lenovo Group Ltd., et al..*; U.S. District Court, for the District of Delaware (Wilmington); Civil Action No. 1:15-cv-00544-SLR-SRF; Includes documents filed from Jan. 25, 2017-Mar. 17, 2017; Docket Nos. 118-135; (103 pages).
Documents filed with U.S. District Court Proceedings for *Evolved Wireless, LLC* v. *Lenovo Group Ltd., et al..*; U.S. District Court, for the District of Delaware (Wilmington); Civil Action No. 1:15-cv-00544-SLR-SRF; Includes documents filed from Mar. 20, 2017-May 30, 2017; Docket Nos. 138-147; (179 pages).
Documents filed with U.S. District Court Proceedings for *Evolved Wireless, LLC* v. *Lenovo Group Ltd., et al..*; U.S. District Court, for the District of Delaware (Wiimington); Civil Action No. 1:15-cv-00544-SLR-SRF; Includes documents filed from Jun. 14, 2017-Aug. 25, 2017; Docket Nos. 148-179; (264 pages).
Documents filed with U.S. District Court Proceedings for *Evolved Wireless, LLC* v. *Lenovo Group Ltd., et al..*; U.S. District Court, for the District of Delaware (Wilmington); Civil Action No. 1:15-cv-00544-SLR-SRF; Includes documents filed from Aug. 31, 2017-Oct. 3, 2017; Docket Nos. 180-287; (255 pages).
Documents filed with U.S. District Court Proceedings for *Evolved Wireless, LLC* v. *Lenovo Group Ltd., et al..*; U.S. District Court, for the District of Delaware (Wilmington); Civil Action No. 1:15-cv-00544-SLR-SRF; Includes documents filed from Oct. 6, 2017- Jan. 3, 2018: Docket Nos. 208-273; (3,364 pages).
Documents filed with U.S. District Court Proceedings for *Evolved Wireless, LLC* v. *Lenovo Group Ltd., et al..*; U.S. District Court, for the District of Delaware (Wilmington); Civil Action No. 1:15-cv-00544-SLR-SRF; Includes documents filed from Jan. 5, 218-Apr. 16, 2018; Docket Nos. 274-337; (1,456 pages).
Documents filed with U.S. District Court Proceedings for *Evolved Wireless, LLC* v. *Lenovo Group Ltd., et al..*; U.S. District Court, for the District of Delaware (Wilmington); Civil Action No. 1:15-cv-00544-SLR-SRF; Includes documents filed from Apr. 23, 2018-Jun. 28, 2018; Docket Nos. 338-346; (114 pages).
Documents filed with U.S. District Court Proceedings for *Evolved Wireless, LLC* v. *Motorola Mobility, et al..*; U.S. District Court, for the District of Delaware (Wilmington); Civil Action No. 1:15-cv-00544-SLR-SRF; Includes documents filed from Jul. 24, 2018-Aug. 24, 2018; Docket Nos. 347-365; (139 pages).
Documents filed with U.S. District Court Proceedings for *Evolved Wireless, LLC* v. *Motorola Mobility, et al..*; U.S. District Court, for the District of Delaware (Wilmington); Civil Action No. 1:15-cv-00544-SLR-SRF; Includes documents filed from Sep. 4, 2018-Oct. 3, 2018; Docket Nos. 363-371; (60 pages).
Documents filed with U.S. District Court Proceedings for *Evolved Wireless, LLC* v. *Motorola Mobility, et al..*; U.S. District Court, for the District of Delaware (Wilmington); Civil Action No. 1:15-cv-00544-SLR-SRF; Includes documents filed from Dec. 31, 2018-Mar. 28, 2019; Docket Nos. 372-391; (140 pages).
Documents filed with U.S. District Court Proceedings for *Evolved Wireless, LLC* v. *Motorola Mobility, et al..*; U.S. District Court, for the District of Delaware (Wilmington); Civil Action No. 1:15-cv-00544-SLR-SRF; Includes documents filed on May 1, 2019; Docket No. 392; (3 pages).
Documents filed with U.S. District Court Proceedings for *Evolved Wireless, LLC* v. *Motorola Mobility, et al..*; U.S. District Court, for the District of Delaware (Wilmington); Civil Action No. 1:15-cv-00544-SLR-SRF; Includes documents filed on Jun. 13, 2019; Docket No. 393; (7 pages).
Documents filed with U.S. District Court Proceedings for *Evolved Wireless, LLC* v. *Motorola Mobility, et al..*; U.S. District Court, for the District of Delaware (Wilmington); Civil Action No. 1:15-cv-00544-SLR-SRF; Includes documents filed from Aug. 29, 2019-Oct. 11, 2019; Docket Nos. 394-397: (17 pages).
Documents filed with U.S. District Court Proceedings for *Evolved Wireless, LLC* v. *Motorola Mobility, et al..*; U.S. District Court, for the District of Delaware (Wilmington); Civil Action No. 1:15-cv-00544-SLR-SRF; Includes documents filed from Nov. 15, 2019-Jan. 13, 2020; Docket Nos. 398-414; (70 pages).
Documents filed with U.S. District Court Proceedings for *Evolved Wireless, LLC* v. *Motorola Mobility, et al..*; U.S. District Court, for the District of Delaware (Wilmington); Civil Action No. 1:15-cv-00544-SLR-SRF; Includes documents on Sep. 3, 2020; Docket No. 415; (643 pages).
Documents filed with U.S. District Court Proceedings for *Evolved Wireless, LLC* v. *Motorola Mobility, et al..*; U.S. District Court, for the District of Delaware (Wilmington); Civil Action No. 1:15-cv-00544-SLR-SRF; Includes documents filed from Mar. 4, 2021-Jul. 7, 2021; Docket Nos. 416-437; (497 pages).
Documents filed with U.S. District Court Proceedings for *Evolved Wireless, LLC* v. *Samsung Electronics Co. Ltd., et al..*; U.S. District Court, for the District of Delaware (Wilmington); Civil Action No. 1:15-cv-00545-SLR-SRF; Includes documents filed from Jun. 25, 2015- May 17, 2016 Docket Nos. 1-56; (1202 pages).
Documents filed with U.S. District Court Proceedings for *Evolved Wireless, LLC* v. *Samsung Electronics Co. Ltd., et al..*; U.S. District Court, for the District of Delaware (Wilmington); Civil Action No. 1:15-cv-00545-SLR-SRF; Includes documents filed from May 26, 2016-Jul. 11, 2016 Docket Nos. 57-77; (4,713 pages).
Documents filed with U.S. District Court Proceedings for *Evolved Wireless, LLC* v. *Samsung Electronics Co. Ltd., et al..*; U.S. District Court, for the District of Delaware (Wilmington); Civil Action No. 1:15-cv-00545-SLR-SRF; Includes documents filed from Jul. 15, 2016-Aug. 19, 2016; Docket Nos. 78-91; (354 pages).
Documents filed with U.S. District Court Proceedings for *Evolved Wireless, LLC* v. *Samsung Electronics Co. Ltd., et al..*; U.S. District Court, for the District of Delaware (Wilmington); Civil Action No. 1:15-cv-00545-SLR-SRF; Includes documents filed from Aug. 23, 2016-Nov. 8, 2016; Docket Nos. 92-126; (775 pages).
Documents filed with U.S. District Court Proceedings for *Evolved Wireless, LLC* v. *Samsung Electronics Co. Ltd., et al..*; U.S. District Court, for the District of Delaware (Wilmington); Civil Action No. 1:15-cv-00545-SLR-SRF; Includes documents filed from Nov. 9, 2016-Dec. 7, 2016; Docket Nos. 127-139; (220 pages).
Documents filed with U.S. District Court Proceedings for *Evolved Wireless, LLC* v. *Samsung Electronics Co. Ltd., et al..*; U.S. District Court, for the District of Delaware (Wilmington); Civil Action No. 1:15-cv-00545-SLR-SRF; Includes documents filed from Dec. 27, 2016-Jan. 23, 2017; Docket Nos. 140-146; (17 pages).
Documents filed with U.S. District Court Proceedings for *Evolved Wireless, LLC* v. *Samsung Electronics Co. Ltd., et al..*; U.S. District Court, for the District of Delaware (Wilmington); Civil Action No. 1:15-cv-00545-SLR-SRF; Includes documents filed from Jan. 24, 2017-Mar. 17, 2017; Docket Nos. 147 -168; (107 pages).
Documents filed with U.S. District Court Proceedings for *Evolved Wireless, LLC* v. *Samsung Electronics Co, Ltd., et al..*; U.S. District Court, for the District of Delaware (Wilmington); Civil Action No. 1:15-cv-00545-SLR-SRF; Includes documents fifed from Mar. 21, 2017-May 30, 2017; Docket Nos. 169-183; (185 pages).
Documents filed with U.S. District Court Proceedings for *Evolved Wireless, LLC* v. *Samsung Electronics Co. Ltd., et al..*; U.S. District Court, for the District of Delaware (Wilmington); Civil Action No. 1:15-cv-00545-SLR-SRF; Includes documents filed from Jun. 14, 2017-Aug. 25, 2017; Docket Nos. 184-221; (281 pages).

(56) References Cited

OTHER PUBLICATIONS

Documents filed with U.S. District Court Proceedings for *Evolved Wireless, LLC* v. *Samsung Electronics Co. Ltd., et al..*; U.S. District Court, for the District of Delaware (Wilmington); Civil Action No. 1:15-cv-00545-SLR-SRF; Includes documents filed from Aug. 31, 2017-Sep. 28, 2017; Docket Nos. 222-244; (241 pages).
Documents filed with U.S. District Court Proceedings for *Evolved Wireless, LLC* v. *Samsung Electronics Co. Ltd., et al..*; U.S. District Court, for the District of Delaware (Wilmington); Civil Action No. 1:15-cv-00545-SLR-SRF; Includes documents filed from Oct. 6, 2017-Jan. 3, 2018; Docket Nos. 245-312; (3,694 pages).
Documents filed with U.S. District Court Proceedings for *Evolved Wireless, LLC* v. *Samsung Electronics Co. Ltd., et al..*; U.S. District Court, for the District of Delaware (Wilmington); Civil Action No. 1:15-cv-00545-SLR-SRF; Includes documents filed from Jan. 5, 2018-Apr. 16, 2018; Docket Nos. 313-377; (1,508 pages).
Documents filed with U.S. District Court Proceedings for *Evolved Wireless, LLC* v. *Samsung Electronics Co. Ltd., et al..*; U.S. District Court, for the District of Delaware (Wilmington); Civil Action No. 1:15-cv-00545-SLR-SRF; Includes documents filed from April 23, 2018-Jun. 28, 2018; Docket Nos. 378-386; (114 pages).
Documents filed with U.S. District Court Proceedings for *Evolved Wireless, LLC* v. *Samsung Electronics Co. Ltd., et al..*; U.S. District Court, for the District of Delaware (Wilmington); Civil Action No. 1:15-cv-00545-SLR-SRF; Includes documents filed from Jul. 24, 2018-Aug. 24, 2018; Docket Nos. 387-401; (89 pages).
Documents filed with U.S. District Court Proceedings for *Evolved Wireless, LLC* v. *Samsung Electronics Co. Ltd., et al..*; U.S. District Court, for the District of Delaware (Wilmington); Civil Action No. 1:15-cv-00545-SLR-SRF; includes documents filed from Aug, 30, 2018-Oct. 3, 2018; Docket Nos. 402-428; (389 pages).
Documents filed with U.S. District Court Proceedings for *Evolved Wireless, LLC* v. *Samsung Electronics Co. Ltd., et al..*; U.S. District Court, for the District of Delaware (Wilmington); Civil Action No. 1:15-cv-00545-SLR-SRF; Includes documents filed from Dec. 31, 2018-Mar. 28, 2019; Docket Nos. 429-474; (774 pages).
Documents filed with U.S. District Court Proceedings for *Evolved Wireless, LLC* v. *Samsung Electronics Co. Ltd., et al..*; U.S. District Court, for the District of Delaware (Wilmington); Civil Action No. 1:15-cv-00545-SLR-SRF; Includes documents filed on May 1, 2019: Docket No. 475; (3 pages).
Documents filed with U.S. District Court Proceedings for *Evolved Wireless, LLC* v. *Samsung Electronics Co. Ltd., et al..*; U.S. District Court, for the District of Delaware (Wilmington); Civil Action No. 1:15-cv-00545-SLR-SRF; Includes documents filed on Jun. 13, 2019; Docket No. 476; (7 pages).
Documents filed with U.S. District Court Proceedings for *Evolved Wireless, LLC* v. *Samsung Electronics Co. Ltd., et al..*; U.S. District Court, for the District of Delaware (Wilmington); Civil Action No. 1:15-cv-00545-SLR-SRF; includes documents filed from Aug. 29, 2019-Oct. 11, 2019; Docket Nos. 477-480; (17 pages).
Documents filed with U.S. District Court Proceedings for *Evolved Wireless, LLC* v. *Samsung Electronics Co. Ltd., et al..*; U.S. District Court, for the District of Delaware (Wilmington); Civil Action No. 1:15-cv-00545-SLR-SRF; Includes documents filed from Nov. 15, 2019-Jan. 17, 2020; Docket Nos. 481-493; (65 pages).
Documents filed with U.S. District Court Proceedings for *Evolved Wireless, LLC* v. *Samsung Electronics Co. Ltd., et al..*; U.S. District Court, for the District of Delaware (Wilmington); Civil Action No. 1:15-cv-00545-SLR-SRF; Includes documents filed Feb. 13, 2020; Docket No. 494; (2 pages).
Documents filed with U.S. District Court Proceedings for *Evolved Wireless, LLC* v. *Samsung Electronics Co. Ltd., et al..*; U.S. District Court, for the District of Delaware (Wilmington); Civil Action No. 1:15-cv-00545-SLR-SRF; Includes documents filed Sep. 3, 2020; Docket No. 495; (643 pages).
Documents filed with U.S. District Court Proceedings for *Evolved Wireless, LLC* v. *Samsung Electronics Co. Ltd., et al..*; U.S. District Court, for the District of Delaware (Wilmington); Civil Action No. 1:15-cv-00545-SLR-SRF; Includes documents filed from Mar. 4, 2021-Apr. 14, 2021; Docket Nos. 496-499; (29 pages).
Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Jun. 25, 2015-May 17, 2016 Docket Nos. 1-57; (1203 pages).
Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from June 1, 2016-Jul. 11, 2016 Docket Nos. 58-70; (4,001 pages).
Documents filed with U.S. District Court Proceedings for *Evolved Wireless, LLC* v. *ZTE Corporation*: U.S. District Court, for the District of Delaware (Wiimington); Civil Action No. 1:15-cv-00546-SLR-SRF; Includes documents filed from Jul. 15, 2016-Aug. 19, 2016; Docket Nos. 71-79; (308 pages).
Documents filed with U.S. District Court Proceedings for *Evolved Wireless, LLC* v. *ZTE Corporation*; U.S. District Court, for the District of Delaware (Wilmington); Civil Action No. 1:15-CV-00546-SLR-SRF; Includes documents filed from Aug. 23, 2016-Nov. 8, 2016; Docket Nos. 80-113; (733 pages).
Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Nov. 9, 2016-Dec. 7, 2016; Docket Nos. 114-124; (212 pages).
Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Dec. 27, 2016-Jan. 17, 2017; Docket Nos. 125-127; (9 pages).
Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Jan. 25, 2017-Mar. 17, 2017; Docket Nos. 128-153; (135 pages).
Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Mar. 20, 2017-May 30, 2017; Docket Nos. 154-165; (178 pages).
Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Jun. 14, 2017-Aug. 25, 2017; Docket Nos. 166-193; (254 pages).
Documents filed with U.S. District Court Proceedings for *Evolved Wireless, LLC* v. *ZTE Corporation*; U.S, District Court, for the District of Delaware (Wilmington); Civil Action No. 1:15-cv-00546-SLR-SRF; includes documents filed from Aug. 31, 2017-Sept. 28, 2017; Docket Nos. 194-218; (244 pages).
Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Oct. 6, 2017-Jan. 3, 2018; Docket Nos. 219-276; (3,378 pages).
Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from January 5, 2018-Apr. 16, 2018; Docket Nos. 277-339; (1,196 pages).
Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Apr. 23, 2018-Jun. 28, 2018; Docket Nos. 340-348; (114 pages).
Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Jul. 24, 2018-Aug. 24, 2018; Docket Nos. 349-369; (141 pages).

(56) References Cited

OTHER PUBLICATIONS

Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Sept. 4, 2018-Oct. 3, 2018; Docket Nos. 370-375; (60 pages).

Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Dec. 31, 2018-Mar. 28, 2019; Docket Nos. 376-394; (138 pages).

Documents filed with U.S. District Court Proceedings for *Evolved Wireless, LLC* v. *ZTE Corporation*; U.S. District Court, for the District of Delaware (Wiimington); Civil Action No. 1:15-cv-00546-SLR-SRF; Includes documents filed on May 1, 2019; Docket No. 395; (3 pages).

Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed on Jun. 13, 2019; Docket No. 396; (7 pages).

Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Aug. 29, 2019-Oct. 11, 2019; Docket Nos. 397-400; (17 pages).

Documents filed with U.S. District Court Proceedings for *Evolved Wireless, LLC* v. *ZTE Corporation*; U.S. District Court, for the District of Delaware (Wiimington); Civil Action No. 1:15-cv-00546-SLR-SRF; Includes documents filed from Nov. 15, 2019-Jan. 8, 2020; Docket Nos. 401-411; (61 pages).

Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed Sep. 3, 2020; Docket No. 412; (643 pages).

Documents filed with U.S. District Court Proceedings for *Evolved Wireless, LLC* v. *ZTE Corporation*; U.S. District Court, for the District of Delaware (Wilmington); Civil Action No. 1:15-cv-00546-SLR-SRF; Includes documents filed from Mar. 4, 2021-Mar. 24, 2021; Docket Nos. 413-415; (21 pages).

Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from June 25, 2015-May 17, 2016 Docket Nos. 1-57; (1273 pages).

Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from May 18, 2016-Jul. 11, 2016—Docket Nos. 58-69; (3,996 pages).

Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Jul. 15, 2016-Aug. 19, 2016—Docket Nos. 70-78; (305 pages).

Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Aug, 24, 2016-Nov. 8, 2016—Docket Nos. 79-113; (796 pages).

Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Nov. 9. 2016-Dec. 14, 2016—Docket Nos. 114-129; (129 pages).

Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Dec. 19, 2016-Jan. 17, 2017; Docket Nos. 130-133; (11 pages).

Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Jan. 25, 2017-Mar. 17, 2017; Docket Nos. 134-151; (98 pages).

Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Mar. 21, 2017-May 30, 2917; Docket Nos. 151-165; (176 pages).

Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Jun. 5, 2017-Aug. 25, 2017; Docket Nos. 166-192; (155 pages).

Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Aug. 31, 2017-Sep. 28, 2017; Docket Nos. 193-218; (232pages).

Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Oct, 6, 2017-Jan, 3, 2018; Docket Nos. 219-289; (3,748 pages).

Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Jan. 5, 2018—Apr. 16, 2018: Docket Nos. 290-358; (1,476 pages).

Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Apr. 23, 2018-Jun. 28, 2018; Docket Nos. 359-364; (58 pages).

Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Jul. 5, 2018-Aug. 24, 2018; Docket Nos. 365-385; (136 pages).

Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Aug. 28, 2018-Oct. 3, 2018; Docket Nos. 386-393; (61 pages).

Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Dec. 31, 2018-Mar. 28, 2019; Docket Nos. 394-412; (134 pages).

Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed on May 1, 2019; Docket No. 413; (2 pages).

Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed on Jun. 13, 2019; Docket No. 414; (7 pages).

Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Aug. 29, 2019-Oct. 11, 2019; Docket Nos. 415-418; (17 pages).

Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Nov. 15, 2019-Jan. 8, 2020; Docket Nos. 419-431; (62 pages).

(56) References Cited

OTHER PUBLICATIONS

Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed Sep. 3, 2020; Docket Nos. 432-433; (1286 pages).
Documents filed with U.S. District Court Proceedings for *Evolved Wireless, LLC* v. *Microsoft Corporation, et al.*; U.S. District Court, for the District of Delaware (Wilmington); Civil Action No. 1:15-cv-00547-SLR-SRF; Includes documents filed from Mar. 4, 2021-Apr. 2, 2021; Docket Nos. 434-437; (26 pages).
Documents filed with U.S. Court of Appeals for the Federal Circuit for *Evolved Wireless, LLC* v. *ZTE (USA) Inc.*; Appeal Docket No. 18-2008; Includes documents filed from May 25, 2018-Oct. 4, 2019; Docket Nos. 1-130; (4386 pages).
Documents filed with U.S. Court of Appeals for the Federal Circuit for *Evolved Wireless, LLC* v. *ZTE (USA) Inc.*; Appeal Docket No. 18-2008; Includes documents filed on Nov. 15, 2019; Docket No. 131; (2 pages).
Documents filed with U.S. Court of Appeals for the Federal Circuit for *Evolved Wireless, LLC* v. *Samsung Electronics Co., Ltd.*; Appeal Docket No. 18-2009; Includes documents filed from May 25, 2018-Oct. 4, 2019; Docket Nos. 1-6; (110 pages).
Documents filed with U.S. Court of Appeals for the Federal Circuit for *Evolved Wireless, LLC* v. *Samsung Electronics Co., Ltd.*; Appeal Docket No. 18-2009; Includes documents filed on Nov. 25, 2019; Docket No. 7; (2 pages).
Documents filed with U.S. Court of Appeals for the Federal Circuit for *Evolved Wireless, LLC* v. *Apple Inc.*; Appeal Docket No. 18-2010; Includes documents filed from May 25, 2018-Oct. 4, 2019; Docket Nos. 1-24; (216 pages).
Documents filed with U.S. Court of Appeals for the Federal Circuit for *Evolved Wireless, LLC* v. *Apple Inc.*: Appeal Docket No. 18-2010; Includes documents filed on Nov. 25, 2019: Docket No. 25; (2 pages).
Documents filed with U.S. Court of Appeals for the Federal Circuit for *Evolved Wireless, LLC* v. *Apple Inc.*; Appeal Docket No. 18-2011; Includes documents filed from May 25, 2018-Oct. 4, 2019; Docket Nos. 1-5; (162 pages).
Documents filed with U.S. Court of Appeals for the Federal Circuit for *Evolved Wireless, LLC* v. *Apple Inc.*; Appeal Docket No. 18-2011; Includes documents filed on Nov. 25, 2019; Docket No. 6; (2 pages).
Documents filed with U.S. Court of Appeals for the Federal Circuit for *Evolved Wireless, LLC* v. *Apple Inc.*; Appeal Docket No. 19-2362; Includes documents filed from Sep. 5, 2019-Oct. 21, 2019; Docket Nos. 1-15; (102 pages).
Documents filed with U.S. Court of Appeals for the Federal Circuit for *Evolved Wireless, LLC* v. *Apple Inc.*: Appeal Docket No. 19-2362; Includes documents filed from Dec. 4, 2019-Jan. 27, 2020; Docket Nos. 16-21; (224 pages).
Documents filed with U.S. Court of Appeals for the Federal Circuit for *Evolved Wireless, LLC* v. *Apple Inc.*; Appeal Docket No. 19-2362; Includes documents filed from Feb. 12, 2020-Feb. 28, 2020; Docket Nos. 22-24; (73 pages).
Documents filed with U.S. Court of Appeals for the Federal Circuit for *Evolved Wireless, LLC* v. *Apple Inc.*; Appeal Docket No. 19-2362; Includes documents filed from May 4, 2020-Jun. 23, 2020; Docket Nos. 25-31; (578 pages).
Documents filed with U.S. Court of Appeals for the Federal Circuit for *Evolved Wireless, LLC* v. *HTC Corporation*; Appeal Docket No. 2020-1335; Includes documents filed from Jan. 8, 2020-Jan. 27, 2020; Docket Nos. 1-36; (158 pages).
Documents filed with U.S. Court of Appeals for the Federal Circuit for *Evolved Wireless, LLC* v. *HTC Corporation*; Appeal Docket No. 2020-1335; Includes documents filed from Jan. 27, 2020-Jan. 31, 2020; Docket Nos. 37-40; (9 pages).
Documents filed with U.S. Court of Appeals for the Federal Circuit for *Evolved Wireless, LLC* v. *HTC Corporation*; Appeal Docket No. 2020-1335; Includes documents filed from Mar. 9, 2020-Sep. 16, 2020; Docket Nos. 41-73; (1125 pages).
Documents filed with U.S. Court of Appeals for the Federal Circuit for *Evolved Wireless, LLC* v. *HTC Corporation*; Appeal Docket No. 2020-1335; Includes documents filed from Sep. 23, 2020-Nov. 16, 2020; Docket Nos. 75 and 79-31; (6 pages).
Documents filed with U.S. Court of Appeals for the Federal Circuit for *Evolved Wireless, LLC* v. *HTC Corporation*; Appeal Docket No. 2020-1335; Includes publicly available documents filed from Jan. 26, 2021-Mar. 4, 2021; Docket Nos. 84-86; (19 pages).
Documents filed with U.S. Court of Appeals for the Federal Circuit for *Evolved Wireless, LLC* v. *Motorola Mobility, LLC*; Appeal Docket No. 2020-1337; Includes documents filed from Jan. 8, 2020-Jan. 24, 2020; Docket Nos. 1-9; (95 pages).
Documents filed with U.S. Court of Appeals for the Federal Circuit for *Evolved Wireless, LLC* v. *Motorola Mobility, LLC*; Appeal Docket No. 2020-1337; Includes documents filed from Jan. 26, 2021-Mar. 4, 2021; Docket Nos. 10-12; (19 pages).
Documents filed with U.S. Court of Appeals for the Federal Circuit for *Evolved Wireless, LLC* v. *ZTE(USA) Inc.*; Appeal Docket No. 2020-1339; Includes documents filed from Jan. 8, 2020-Jan. 23, 2020; Docket Nos. 1-9; (63 pages).
Documents filed with U.S. Court of Appeals for the Federal Circuit for *Evolved Wireless, LLC* v. *ZTE(USA) Inc.*; Appeal Docket No. 2020-1339; Includes documents filed from Jan. 26, 2021-Mar. 4, 2021; Docket Nos. 10-12; (19 pages).
Documents filed with U.S. Court of Appeals for the Federal Circuit for *Evolved Wireless, LLC* v. *Microsoft Corporation*; Appeal Docket No. 2020-1340; Includes documents filed from Jan. 8, 2020-Jan. 21, 2020; Docket Nos. 1-3; (52 pages).
Documents filed with U.S. Court of Appeals for the Federal Circuit for *Evolved Wireless, LLC* v. *Microsoft Corporation*; Appeal Docket No. 2020-1340; Includes documents filed from Jan. 26, 2021-Mar. 4, 2021; Docket Nos. 4-6; (19 pages).
Documents filed with U.S. Court of Appeals for the Federal Circuit for *Evolved Wireless, LLC* v. *Samsung Electronics Co., Ltd.*; Appeal Docket No. 2020-1363; Includes documents filed from Jan. 17, 2020-Jan. 21, 2020; Docket Nos. 1-3; (59 pages).
Documents filed with U.S. Court of Appeals for the Federal Circuit for *Evolved Wireless, LLC* v. *Samsung Electronics Co., Ltd.*; Appeal Docket No. 2020-1363; Includes documents filed from Jan. 26, 2021-Mar. 4, 2021; Docket Nos. 4-6; (19 pages).
Documents filed with U.S. District Court Proceedings for *Evolved Wireless, LLC* v. *Samsung Electronics Co., Ltd. et. al*; In the United States District Court for the Eastern District of Texas Marshall Division; Civil Action No. 2:21-cv-00033; Includes documents filed from Feb. 1, 2021-Mar. 10, 2021; Docket Nos. 1-14; (1,227 pages).
Documents filed with U.S. District Court Proceedings for *Evolved Wireless, LLC* v. *Motorola Mobility LLC*; In the United States District Court for the Northern District of Illinois Chicago Division; Civil Action No. 1:21-cv-00567; Includes documents filed from Feb. 1, 2021-Dec. 6, 2021; Docket Nos. 1-29; (1,126 pages).
Complaint re *In the Matter of Certain LTE-Compliant Cellular Communication Devices* in the United States International Trade Commission Washington, DC; Inv. No. 337-TA-1253; Filed Feb. 1, 2021 (82 pages).
Order No. 4: Regarding Procedural Schedule *In the Matter of Certain LTE-Compliant Cellular Communication Devices* in the United States International Trade Commission Washington, DC; Inv. No. 337-TA-1253; Filed Mar. 23, 2021 (3 pages).
Order No. 5: Setting Procedural Schedule *In the Matter of Certain LTE-Compliant Cellular Communication Devices* in the United States International Trade Commission Washington, DC; Inv. No. 337-TA-1253; Filed Apr. 2, 2021 (4 pages).
Respondents' Omnibus Invalidity Contentions (Jul. 15, 2021) Including Claim Charts A-1-A7—U.S. Pat. No. 10,517,120 In the Matter of Certain LTE-Compliant Cellular Communication Devices in the United States International Trade Commission Washington, DC; Inv. No. 337-TA-1253; Filed Jul. 15, 2021 (550 pages).
Petition for Inter Partes Review of U.S. Pat. No. 7,881,236, including Exhibits 1001-1046, Case No. IPR2016-00757, filed May 31, 2016 (2,497 pages).

(56) References Cited

OTHER PUBLICATIONS

Documents filed with *ZTE (USA) Inc., et al. v. Evolved Wireless LLC*, United States Patent and Trademark Office—Before the Patent Trial and Appeal Board, Case No. IPR 2016-00757 filed Jun. 2, 2016-Oct. 6, 2016 (19 pages).
Patent Owner's Preliminary Response for *ZTE (USA) Inc., et al. v. Evolved Wireless LLC*, United States Patent and Trademark Office—Before the Patent Trial and Appeal Board, Case No. IPR 2016-00757 filed Sept. 6, 2016 (150 pages).
Decision Instituting Inter Partes Review 37 C.F.R. § 42.108 for *ZTE (USA) Inc., et al. v. Evolved Wireless LLC*, United States Patent and Trademark Office—Before the Patent Trial and Appeal Board, Case No. IPR 2016-00757 filed Dec. 2, 2016 (20 pages).
Decision Instituting Inter Partes Review and Consolidating with IPR2016-00757 37 C.F.R. § 42.108 and 3 7 C.F.R. § 42.122(a) for *ZTE (USA) Inc., et al. v. Evolved Wireless LLC*, United States Patent and Trademark Office—Before the Patent Trial and Appeal Board, Case No. IPR 2016-00757 filed Dec. 2, 2016 (5 pages).
Documents filed with *ZTE (USA) Inc., et al. v. Evolved Wireless LLC*, United States Patent and Trademark Office—Before the Patent Trial and Appeal Board, Case No. IPR 2016-00757 filed Dec. 2, 2016-Mar. 13, 2017 (50 pages).
Patent Owner's Response to Petitioners' Petition for inter Partes Review of U.S. Pat. No. 7,881,236 for *ZTE (USA) Inc., et al. v. Evolved Wireless LLC*, United States Patent and Trademark Office—Before the Patent Trial and Appeal Board, Case No. IPR 2016-00757 filed Mar. 27, 2017 (702 pages).
Documents filed with *ZTE (USA) Inc., et al. v. Evolved Wireless LLC*, United States Patent and Trademark Office—Before the Patent Trial and Appeal Board, Case No. IPR 2016-00757 filed Mar. 30, 2017- May 19, 2017 (19 pages).
Petitioners' Reply to Patent Owner's Response to Petitioner's Petition for Inter Partes Review of U.S. Pat. No. 7,881,236 for *ZTE (USA) Inc., et al. v. Evolved Wireless LLC*, United States Patent and Trademark Office—Before the Patent Trial and Appeal Board, Case No. IPR 2016-00757 filed Jun. 14, 2017 (32 pages).
Documents filed with *ZTE (USA) Inc., et al. v. Evolved Wireless LLC*, United States Patent and Trademark Office—Before the Patent Trial and Appeal Board, Case No. IPR 2016-00757 filed Jul. 10, 2017-Aug. 9, 2017 (81 pages).
Record of Oral Hearing Held: Aug. 8, 2017 for Inter Partes Review of U.S. Pat. No. 7,881,236 for *ZTE (USA) Inc., et al. v. Evolved Wireless LLC*, United States Patent and Trademark Office—Before the Patent Trial and Appeal Board, Case No. IPR 2016-00757 filed Sep. 12, 2017 (64 pages).
Documents filed with *ZTE (USA) Inc., et al. v. Evolved Wireless LLC*, United States Patent and Trademark Office—Before the Patent Trial and Appeal Board, Case No. IPR 2010-00757 filed Oct. 3, 2017-Oct. 26, 2017 (85 pages).
Final Written Decision for inter Partes Review of U.S. Pat. No. 7,881,236 for *ZTE (USA) Inc., et al. v. Evolved Wireless LLC*, United States Patent and Trademark Office—Before the Patent Trial and Appeal Board, Case No. IPR 2016-00757 filed Nov. 30, 2017 (41 pages).
Documents filed with *ZTE (USA) Inc., et al. v. Evolved Wireless LLC*, United States Patent and Trademark Office—Before the Patent Trial and Appeal Board, Case No. IPR 2016-00757 filed Dec. 29, 2017-May 24, 2018 (95 pages).
Petition for Inter Partes Review of U.S. Pat. No. 7,881,236, including Exhibits 1001-1021, Case No. IPR2016-01228, filed Jun. 20, 2016 (742 pages).
Documents filed with *Apple Inc. v. Evolved Wireless LLC*, United States Patent and Trademark Office—Before the Patent Trial and Appeal Board, Case No. IPR 2016-01228 filed Jun. 28, 2016-Jul. 11, 2016 (14 pages).
Patent Owner's Preliminary Response for *Apple Inc. v. Evolved Wireless LLC*, United States Patent and Trademark Office—Before the Patent Trial and Appeal Board, Case No. IPR 2016-01228 filed Sep. 28, 2016 (534 pages).

Decision Instituting Inter Partes Review for *Apple Inc. v. Evolved Wireless LLC*, United States Patent and Trademark Office—Before the Patent Trial and Appeal Board, Case No. IPR 2016-01228 filed Dec. 27, 2016 (22 pages).
Documents filed with *Apple Inc. v. Evolved Wireless LLC*, United States Patent and Trademark Office—Before the Patent Trial and Appeal Board, Case No. IPR 2016-01228 filed Dec. 27, 2016-Jul. 14, 2017 (27 pages).
Patent Owner's Response to Petitioner's Petition for inter Partes Review of U.S. Pat. No. 7,881,236 for *Apple Inc. v. Evolved Wireless LLC*, United States Patent and Trademark Office—Before the Patent Trial and Appeal Board, Case No. IPR 2016-01228 filed Apr. 30, 2017 (505 pages).
Petitioner's Reply to Patent Owner's Response for Inter Partes Review of U.S. Pat. No. 7,881,236 for *Apple Inc. v. Evolved Wireless LLC*, United States Patent and Trademark Office—Before the Patent Trial and Appeal Board, Case No. IPR 2016-01228 filed Jul. 26, 2017 (39 pages).
Documents filed with *Apple Inc. v. Evolved Wireless LLC*, United States Patent and Trademark Office—Before the Patent Trial and Appeal Board, Case No. IPR 2016-01228 filed Aug. 16, 2017-Oct. 26, 2017 (256 pages).
Final Written Decision for Inter Partes Review of U.S. Pat. No. 7,881,236 for *Apple Inc. v. Evolved Wireless LLC*, United States Patent and Trademark Office—Before the Patent Trial and Appeal Board, Case No. IPR 2016-01228 filed Nov. 30, 2017 (42 pages).
Documents submitted with *Apple Inc. v. Evolved Wireless LLC*, United States Patent and Trademark Office—Before the Patent Trial and Appeal Board, Case No. IPR 2916-01228 filed Dec. 29, 2017-May 24, 2018 (96 pages).
Petition for Inter Partes Review of U.S. Pat. No. 7,881,236, including Exhibits 1001-1021, Case No. IPR201 6-01229, filed Jun. 20, 2016 (741 pages).
Documents submitted with *Apple Inc. v. Evolved Wireless LLC*, United States Patent and Trademark Office—Before the Patent Trial and Appeal Board, Case No. IPR 2016-01229 filed Jun. 28, 2016-Jul. 11, 2016 (14 pages).
Patent Owner's Preliminary Response for *Apple Inc. v. Evolved Wireless LLC*, United States Patent and Trademark Office—Before the Patent Trial and Appeal Board, Case No. IPR 2016-01229 filed Sep. 29, 2016 (616 pages).
Decision Instituting Inter Partes Review 37 C.F.R. 42.108 for *Apple Inc. v. Evolved Wireless LLC*, United States Patent and Trademark Office—Before the Patent Trial and Appeal Board, Case No. IPR 2016-01229 filed Dec. 27, 2016 (21 pages).
Documents submitted with *Apple Inc. v. Evolved Wireless LLC*, United States Patent and Trademark Office—Before the Patent Trial and Appeal Board, Case No. IPR 2016-01229 filed Dec. 27, 2016-Apr. 7, 2017 (22 pages).
Patent Owner's Response to Petitioners' Petition for Inter Partes Review of U.S. Pat. No. 7,881,236 for *Apple Inc. v. Evolved Wireless LLC*, United States Patent and Trademark Office—Before the Patent Trial and Appeal Board, Case No. IPR 2016-01229 filed Apr. 30, 2017 (506 pages).
Documents submitted with *Apple Inc. v. Evolved Wireless LLC*, United States Patent and Trademark Office—Before the Patent Trial and Appeal Board, Case No. IPR 2016-01229 filed Jul. 14, 2017-Oct. 26, 2017 (261 pages).
Petitioner's Reply to Patent Owner's Response for Inter Partes Review of U.S. Pat. No. 7,881,236 for *Apple Inc. v. Evolved Wireless LLC*, United States Patent and Trademark Office—Before the Patent Trial and Appeal Board, Case No. IPR 2016-01229 filed Jul. 26, 2017 (42 pages).
Final Written Decision for Inter Partes Review of U.S. Pat. No. 7,881,236 for *Apple Inc. v. Evolved Wireless LLC*, United States Patent and Trademark Office—Before the Patent Trial and Appeal Board, Case No. IPR 2016-01229 filed Nov. 30, 2017 (43 pages).
Documents submitted with *Apple Inc. v. Evolved Wireless LLC*, United States Patent and Trademark Office—Before the Patent Trial and Appeal Board, Case No. IPR 2916-01229 filed Dec. 29, 2017-May 24, 2018 (97 pages).

(56) References Cited

OTHER PUBLICATIONS

Petition for Inter Partes Review of U.S. Pat. No. 7,881,236, including Exhibits 1001-1047, Case No. IPR2016-01345, filed Jul. 1, 2016 (2,570 pages).
Documents submitted with *Samsung Electronics Co., Ltd., et al.* v. *Evolved Wireless LLC*, United States Patent and Trademark Office—Before the Patent Trial and Appeal Board, Case No. IPR 2016-01345 filed Jul. 22, 2016-Jul. 28, 2016 (13 pages).
Patent Owner's Preliminary Response for *Samsung Electronics Co., Ltd., et al.* v. *Evolved Wireless LLC*, United States Patent and Trademark Office—Before the Patent Trial and Appeal Board, Case No. IPR 2016-01345 filed Sep. 27, 2016, (305 pages).
Decision Instituting Inter Partes Review and Consolidating with IPR2016-00757 37 C.F.R. § 42.108 and 37 C.F.R. § 42.122(a) for *Samsung Electronics Co., Ltd., et al.* v. *Evolved Wireless LLC*, United States Patent and Trademark Office—Before the Patent Trial and Appeal Board, Case No. IPR 2016-01345 filed Dec. 2, 2016 (5 pages).
Documents submitted with *Samsung Electronics Co., Ltd., et al.* v. *Evolved Wireless LLC*, United States Patent and Trademark Office—Before the Patent Trial and Appeal Board, Case No. IPR 2016-01345 filed Dec. 2, 2016-Oct. 26, 2017 (29 pages).
Final Written Decision for *Samsung Electronics Co., Ltd., et al.* v. *Evolved Wireless LLC*, United States Patent and Trademark Office—Before the Patent Trial and Appeal Board, Case No. IPR 2016-01345 filed Nov. 30, 2017 (41 pages).
Documents submitted with *Samsung Electronics Co., Ltd., et al.* v. *Evolved Wireless LLC*, United States Patent and Trademark Office—Before the Patent Trial and Appeal Board, Case No. IPR 2016-01345 filed Dec. 29, 2017-May 24, 2018 (69 pages).
Petition for Inter Partes Review of U.S. Pat. No. 10,517,120, including Exhibits 1001-1049, Case No. IPR2021-00943, filed May 16, 2021 (3,690 pages).
Documents submitted with *Samsung Electronics Co., Ltd., et al.* v. *Evolved Wireless LLC*, United States Patent and Trademark Office—Before the Patent Trial and Appeal Board, Case No. IPR 2021-00943 filed Jun. 4, 2021-Jun. 7, 2021 (13 pages).
Patent Owner Evolved Wireless LLC's Preliminary Response Pursuant to 37 C.F.R. 42.107(a), including Exhibits 2001-2012 submitted with *Samsung Electronics Co., Ltd., et al.* v. *Evolved Wireless LLC*, United States Patent and Trademark Office—Before the Patent Trial and Appeal Board, Case No. IPR 2021-00943 filed Sep. 7, 2021 (705 pages).
Documents submitted with *Samsung Electronics Co., Ltd., et al.* v. *Evolved Wireless LLC*, United States Patent and Trademark Office—Before the Patent Trial and Appeal Board, Case No. IPR 2021-00943 filed Oct. 1, 2021- Oct. 5, 2021 (10 pages).
Decision Granting Institution of Inter Partes Review and Scheduling Order submitted with *Samsung Electronics Co., Ltd., et al.* v. *Evolved Wireless LLC*, United States Patent and Trademark Office—Before the Patent Trial and Appeal Board, Case No. IPR 2021-00943 filed Dec. 1, 2021 (38 pages).
*Samsung Electronics Co., LTD. et al.* v. *Equo IP LLC*, Judgment Final Written Decision Determining All Challenged Claims Unpatentable, IPR 2021-00943, U.S. Pat. No. 10,517,120 (Nov. 28, 2022).

\* cited by examiner

DATA TRANSMISSION METHOD AND USER EQUIPMENT FOR THE SAME

CROSS REFERENCE TO RELATED APPLICATIONS

This application is a Continuation of U.S. patent application Ser. No. 16/723,514, filed Dec. 20, 2019, now U.S. Pat. No. 10,939,473, which is a Continuation of U.S. patent application Ser. No. 15/664,686, filed Jul. 31, 2017, now U.S. Pat. No. 10,517,120, which is a Continuation of U.S. patent application Ser. No. 15/294,351, filed Oct. 14, 2016, now U.S. Pat. No. 9,775,177, which is a Continuation of U.S. patent application Ser. No. 13/801,529, filed Mar. 13, 2013, now U.S. Pat. No. 9,532,336, which is a Continuation of U.S. patent application Ser. No. 12/972,366 filed on Dec. 17, 2010, now U.S. Pat. No. 8,422,410, which is a Continuation of U.S. application Ser. No. 12/538,514 filed on Aug. 10, 2009, now U.S. Pat. No. 7,881,236, which claims the benefit of U.S. Provisional Application No. 61/087,988, filed on Aug. 11, 2008, and which claims the benefit of Korean Patent Application No. 10-2009-0057128, filed on Jun. 25, 2009. The entire contents of each of these applications are hereby incorporated by reference in their entirety.

BACKGROUND OF THE INVENTION

Field of the Invention

The present invention relates to a mobile communication technology, and more particularly, to a method for efficiently transmitting data stored in a message 3 (Msg3) buffer and a user equipment for the same.

Discussion of the Related Art

As an example of a mobile communication system to which the present invention is applicable, a 3$^{rd}$ Generation Partnership Project Long Term Evolution (3GPP LTE) communication system will be schematically described.

FIG. 1 is a schematic view showing the network architecture of an Evolved Universal Mobile Telecommunication System (E-UMTS) as an example of a mobile communication system.

The E-UMTS is evolved from the existing UMTS and has been currently standardized in the 3GPP. Generally, the E-UMTS may be called an LTE system.

An E-UMTS network may be largely divided into an Evolved UMTS Terrestrial Radio Access Network (E-UTRAN) 101 and a Core Network (CN) 102. The E-UTRAN 101 may include a User Equipment (UE) 103, a base station (hereinafter, referred to as an "eNode B" or "eNB") 104, and an Access Gateway (AG) 105 positioned at the end of the network and connected to an external network. The AG 105 may be divided into a portion for processing user traffic and a portion for processing control traffic. At this time, an AG for processing new user traffic and an AG for processing control traffic may communicate with each other using a new interface.

One or more cells may exist in one eNode B. A plurality of eNode Bs may be connected by an interface for transmitting the user traffic or control traffic. The CN 102 may include the AG 105 and a node for registering a user of the UE 103. An interface for distinguishing between the E-UTRAN 101 and the CN 102 may be used.

Layers of radio interface protocol between the UE and the network may be classified into a first layer L1, a second layer L2 and a third layer L3 based on three lower layers of an Open System Interconnection (OSI) reference model that is widely known in the field of communication systems. A physical layer belonging to the first layer provides an information transfer service using a physical channel. A Radio Resource Control (RRC) layer belonging to the third layer serves to control radio resources between the UE and the network. The UE and the network exchange an RRC message via the RRC layer. The RRC layer may be distributed and located at network nodes of the eNode B 104 and the AG 105. Alternatively, the RRC layer may be located at only the eNode B 104 or the AG 105.

FIGS. 2 and 3 show the structures of radio interface protocols between the UE and the UTRAN based on a 3GPP radio access network standard.

The radio interface protocols of FIGS. 2 and 3 are horizontally formed of a physical layer, a data link layer and a network layer. The radio interface protocols are vertically formed of a user plane for transmitting data information and a control plane for transmitting control signals. In detail, FIG. 2 shows the layers of a radio protocol control plane and FIG. 3 shows the layers of a radio protocol user plane. The protocol layers of FIGS. 2 and 3 may be divided into a first layer (L1), a second layer (L2) and a third layer (L3) based on three lower layers of an OSI reference model that is widely known in the field of communication systems.

Hereinafter, the layers of the control plane of the radio protocol of FIG. 2 and the user plane of the radio protocol of FIG. 3 will be described.

A physical (PHY) layer of the first layer provides an information transfer service to an upper layer using a physical channel. The PHY layer is connected to an upper layer, such as a Medium Access Control (MAC) layer, via a transport channel. Data is transferred between the MAC layer and the PHY layer via the transport channel. At this time, the transport channel is largely divided into a dedicated transport channel and a common transport channel, depending on whether or not a channel is shared. Data is also transferred between different PHY layers, such as a physical layer of a transmitting side and a physical layer of a receiving side, via a physical channel using radio resources.

Various layers exist in the second layer. First, the MAC layer serves to map various logical channels to various transport channels and serves to multiplex several logical channels into one transport channel. The MAC layer is connected to a Radio Link Control (RLC) layer, which is an upper layer, by the logical channel. The logical channel may be largely divided into a control channel for transmitting information about the control plane and a traffic channel for transmitting information about the user plane according to the kinds of information transmitted.

The RLC layer of the second layer serves to segment and concatenate data received from an upper layer so as to adjust data size such that a lower layer transmits data in a radio section. In addition, the RLC provides three modes, namely, a Transparent Mode (TM), an Unacknowledged Mode (UM) and an Acknowledged Mode (AM) in order to guarantee various Quality of Services (QoSs) requested by Radio Bearers (RBs). In particular, the AM RLC performs a retransmission function using an Automatic Repeat and Request (ARQ) function for reliable data transmission.

A Packet Data Convergence Protocol (PDCP) layer of the second layer performs a header compression function to reduce the size of an Internet Protocol (IP) packet header that includes unnecessary control information and has a relatively large size, for effective transmission in a radio section having a relatively small bandwidth when transmitting an IP packet such as an IPv4 packet or an IPv6 packet. Therefore, only necessary information in a header portion of data is transmitted so as to improve transmission efficiency of the radio section. In the LTE system, the PDCP layer also performs a security function, which includes ciphering for preventing data from being intercepted by a third party and integrity protection for preventing data from being handled by a third party.

A Radio Resource Control (RRC) located at a highest portion of the third layer is defined only in the control plane. The RRC layer handles logical channels, transport channels and physical channels for the configuration, re-configuration and release of RBs. Here, the RBs refer to logical paths provided by the first and second layers of the radio protocol, for data transfer between the UE and the UTRAN, and the configuration of the RBs refers to a process of defining the characteristics of the radio protocol layer and channel necessary for providing a specific service, and setting detailed parameters and operation methods. Each of the RBs is divided into a signaling RB and a data RB. The SRB is used as a path for transmitting an RRC message in the control plane (C-plane), and the DRB is used as a path for transmitting user data in the user plane (U-plane).

Downlink transport channels for transmitting data from a network to a UE may include a Broadcast Channel (BCH) for transmitting system information and a downlink Shared Channel (SCH) for transmitting user traffic or a control message. The traffic or the control message of a downlink multicast or broadcast service may be transmitted via the downlink SCH or via a separate Downlink Multicast Channel (MCH). Uplink transport channels for transmitting data from a UE to a network may include a Random Access Channel (RACH) for transmitting an initial control message and an uplink SCH for transmitting user traffic or a control message.

Downlink physical channels for transmitting information transferred via the downlink transport channels in a radio section between a network and a UE may include a Physical Broadcast Channel (PBCH) for transmitting information about a BCH, a Physical Multicast Channel (PMCH) for transmitting information about an MCH, a Physical Downlink Shared Channel (PDSCH) for transmitting information about a PCH and a downlink SCH, and a Physical Downlink Control Channel (PDCCH) (also referred to as a DL L1/L2 control channel) for transmitting control information provided by the first layer and the second layer, such as downlink (DL) or uplink (UL) scheduling grant information. Uplink physical channels for transmitting information transferred via the uplink transport channels in a radio section between a network and a UE may include a Physical Uplink Shared Channel (PUSCH) for transmitting information about an uplink SCH, a Physical Random Access Channel (PRACH) for transmitting information about an RACH, and a Physical Uplink Control Channel (PUCCH) for transmitting control information provided by the first layer and the second layer, such as a HARQ ACK or NACK, a Scheduling Request (SR), a Channel Quality Indicator (CQT) report.

Hereinafter, a random access procedure provided by an LTE system will be schematically described based on the above description.

First, a UE performs the random access procedure in the following cases.

when the UE performs initial access because there is no RRC Connection with an eNode B,
when the UE initially accesses a target cell in a handover procedure,
when the random access procedure is requested by a command of an eNode B,
when there is uplink data transmission in a situation where uplink time synchronization is not aligned or where a specific radio resource used for requesting radio resources is not allocated, and
when a recovery procedure is performed in case of radio link failure or handover failure.

In the LTE system, there are provided two procedures in selecting a random access preamble: one is a contention based random access procedure in which the UE randomly selects one preamble within a specific group for use, and another is a non-contention based random access procedure in which the UE uses a random access preamble allocated only to a specific UE by the eNode B. The non-contention based random access procedure may be used only in the handover procedure or when it is requested by the command of the base station, as described above.

A random access procedure of a UE with a specific eNode B may largely include (1) a step of, at the UE, transmitting a random access preamble to the eNode B (hereinafter, referred to as a "message 1" transmitting step if such use will not lead to confusion), (2) a step of receiving a random access response from the eNode B in correspondence with the transmitted random access preamble (hereinafter, referred to as a "message 2" receiving step if such use will not lead to confusion), (3) a step of transmitting an uplink message using the information received by the random access response message (hereinafter, referred to as a "message 3" transmitting step if such use will not lead to confusion), and (4) a step of receiving a message corresponding to the uplink message from the eNode B (hereinafter, referred to as a "message 4" receiving step if such use will not lead to confusion).

In the random access procedure, the UE stores data to be transmitted via the message 3 in a message 3 (Msg3) buffer and transmits the data stored in the msg3 buffer in correspondence with the reception of an Uplink (UL) Grant signal. The UL Grant signal indicates information about uplink radio resources which may be used when the UE transmits a signal to the eNode B, and is received on a random access response message received on a PDCCH or a PUSCH in the LTE system. According to the current LTE system standard, it is defined that, if the UL Grant signal is received in a state in which data is stored in the Msg3 buffer, the data stored in the Msg3 buffer is transmitted regardless of the reception mode of the UL Grant signal. As described above, if the data stored in the Msg3 buffer is transmitted in correspondence with the reception of all UL Grant signals, problems may occur. Accordingly, there is a need for research to solve such problems.

SUMMARY OF THE INVENTION

Accordingly, the present invention is directed to a data transmission method and a user equipment for the same that substantially obviate one or more problems due to limitations and disadvantages of the related art.

An object of the present invention is to provide a data transmission method and user equipment for the same, which is capable of solving a problem which may occur when data stored in a message 3 (Msg3) buffer is transmitted according to a reception mode of an Uplink (UL) Grant signal.

Additional advantages, objects and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting data by a user equipment through an uplink includes receiving an uplink grant (UL Grant) signal from a base station on a specific message, determining whether there is data stored in a message 3 (Msg3) buffer when receiving the UL Grant signal on the specific message, determining whether the specific message is a random access response message, and transmitting the data stored in the Msg3 buffer to the base station using the UL Grant signal received on the specific message, if there is data stored in the Msg3 buffer when receiving the UL Grant signal on the specific message and the specific message is the random access response message.

If there is no data stored in the Msg3 buffer when receiving the UL Grant signal on the specific message or the specific message is not the random access response message, new data may be transmitted to the base station in correspondence with the UL Grant signal received on the specific message.

The UL Grant signal received on the specific message may be a UL Grant signal received on a Physical Downlink Control Channel (PDCCH). In this case, the user equipment may transmit new data in correspondence with the UL Grant signal received on the PDCCH.

The UL Grant signal received on the specific message may be a UL Grant signal received on a random access response message received on Physical Downlink Shared Channel (PDSCH). In this case, if there is data stored in the Msg3 buffer when receiving the UL Grant signal on the random access response message, the user equipment may transmit the data stored in the buffer in the Msg3 buffer using the UL Grant signal received on the random access response message.

The data stored in the Msg3 buffer may be a Medium Access Control Protocol Data Unit (MAC PDU) including a user equipment identifier, and the data stored in the Msg3 buffer further include information about a buffer status report (BSR) if the user equipment starts the random access procedure for the BSR.

In another aspect of the present invention, a user equipment includes a reception module receiving an uplink grant (UL Grant) signal from a base station on a specific message, a transmission module transmitting data to the base station using the UL Grant signal received on the specific message, a message 3 (Msg3) buffer storing UL data to be transmitted in a random access procedure, and a Hybrid Automatic Repeat Request (HARQ) entity determining whether there is data stored in the Msg3 buffer when the reception module receives the UL Grant signal and the specific message is a random access response message, acquiring the data stored in the Msg3 buffer if there is data stored in the Msg3 buffer when the reception module receives the UL Grant signal and the specific message is the random access response message, and controlling the transmission module to transmit the data stored in the Msg3 buffer to the base station using the UL Grant signal received by the reception module on the specific message.

The user equipment may further include a multiplexing and assembly entity used for transmission of new data. In this case, the HARQ entity may acquire the new data to be transmitted from the multiplexing and assembly entity if there is no data stored in the Msg3 buffer when the reception module receives the UL Grant signal on the specific message or the received message is not the random access response message, and control the transmission module to transmit the new data acquired from the multiplexing and assembly entity using the UL Grant signal received by the reception module on the specific message.

The user equipment may further include one or more HARQ processes, and HARQ buffers respectively corresponding to the one or more HARQ processes. In this case, the HARQ entity may transfer the data acquired from the multiplexing and assembly entity or the Msg3 buffer to a specific HARQ process of the one or more HARQ processes and control the specific HARQ process to transmit the data acquired from the multiplexing and assembly entity or the Msg3 buffer through the transmission module.

When the specific HARQ process transmits the data stored in the Msg3 buffer through the transmission module, the data stored in the Msg3 buffer may be controlled to be copied into a specific HARQ buffer corresponding to the specific HARQ process, and the data copied into the specific HARQ buffer may be controlled to be transmitted through the transmission module.

The UL Grant signal received by the reception module on the specific message may be a UL Grant signal received on a Physical Downlink Control Channel (PDCCH). In this case, the HARQ entity may control new data to be transmitted in correspondence with the received UL Grant signal received on the PDCCH.

The UL Grant signal received by the reception module on the specific message may be a UL Grant signal received on a random access response message received on Physical Downlink Shared Channel (PDSCH), and the HARQ entity may control the data stored in the Msg3 buffer to be transmitted using the UL Grant signal received on the random access response message if there is data stored in the Msg3 buffer when the reception module receives the UL Grant signal on the random access response message.

According to the above-described embodiments of the present invention, it is possible to transmit data stored in a Msg3 buffer according to a reception mode of a UL Grant signal, without confusion.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out. Hereinafter, the detailed description includes detailed matters to provide full understanding of the present invention. However, it will be apparent to those skilled in the art that the present invention can be carried out without the detailed matters. For example, the following description will be made on the assumption that a mobile communication system is a $3^{rd}$ Generation Partnership Project Long Term Evolution (3GPP LTE) system, but the present invention is applicable to other mobile communication, systems excluding the 3GPP LTE system.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the following description, it is assumed that a terminal includes a mobile or fixed user end device such as a user equipment (UE) and a mobile station (MS), and a base station includes a node of a network end communicating with a terminal, such as a Node-B, an eNode B, and a base station.

As described above, in the following description, a problem which may occur when data stored in a message 3 (Msg3) buffer is transmitted according to a reception mode of an Uplink (UL) Grant signal will be described in detail and a method of solving the problem will be described. Transmission and reception of a signal using a random access procedure and a Hybrid Automatic Repeat Request (HARQ) scheme will be described in detail.

Figure 1:
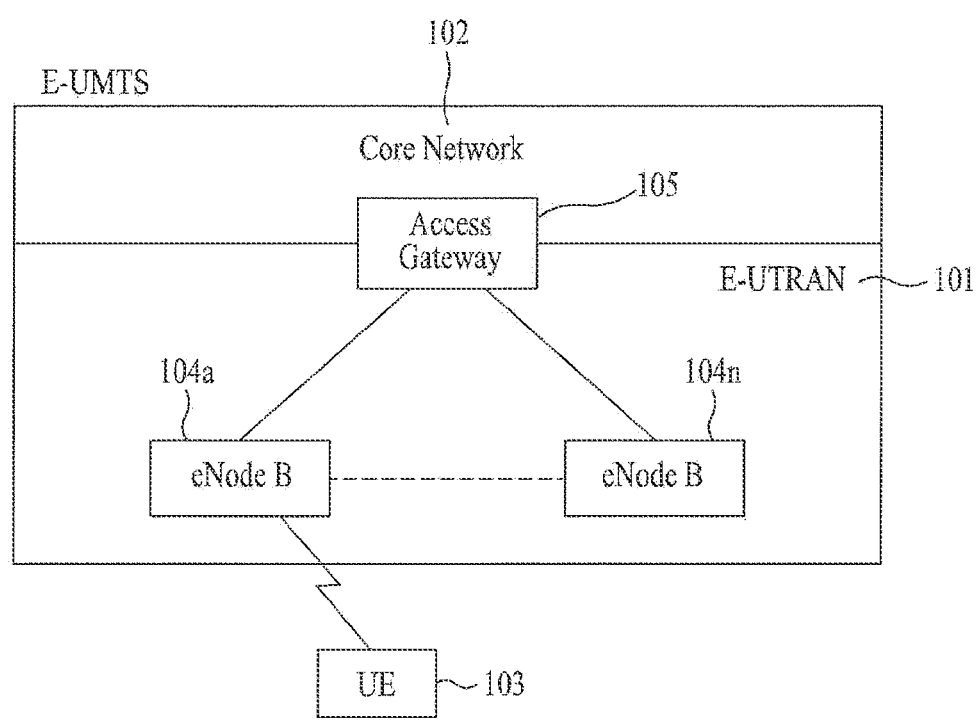
FIG. 1 is a schematic view showing the network architecture of an Evolved Universal Mobile Telecommunication System (E-UMTS) as an example of a mobile communication system.
Figure 2:
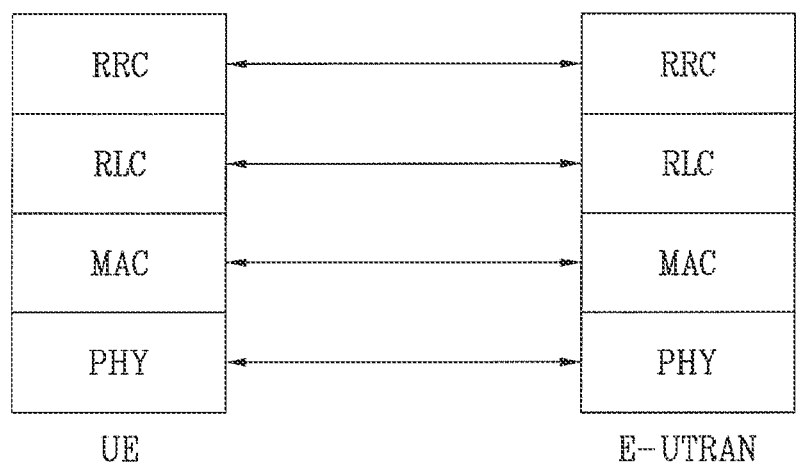
FIGS. 2 and 3 are views showing the structures of radio interface protocols between a user equipment (UE) and a UMTS Terrestrial Radio Access Network (UTRAN) based on a $3^{rd}$ Generation Partnership Project (3GPP) radio access network standard.
Figure 3:
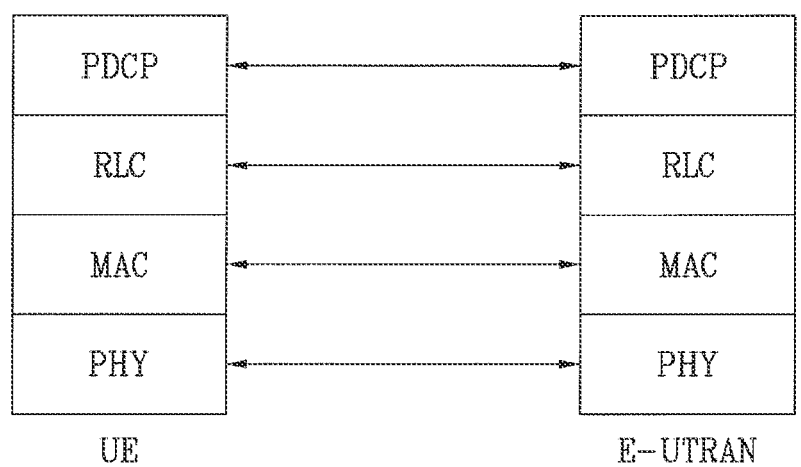
Figure 4:
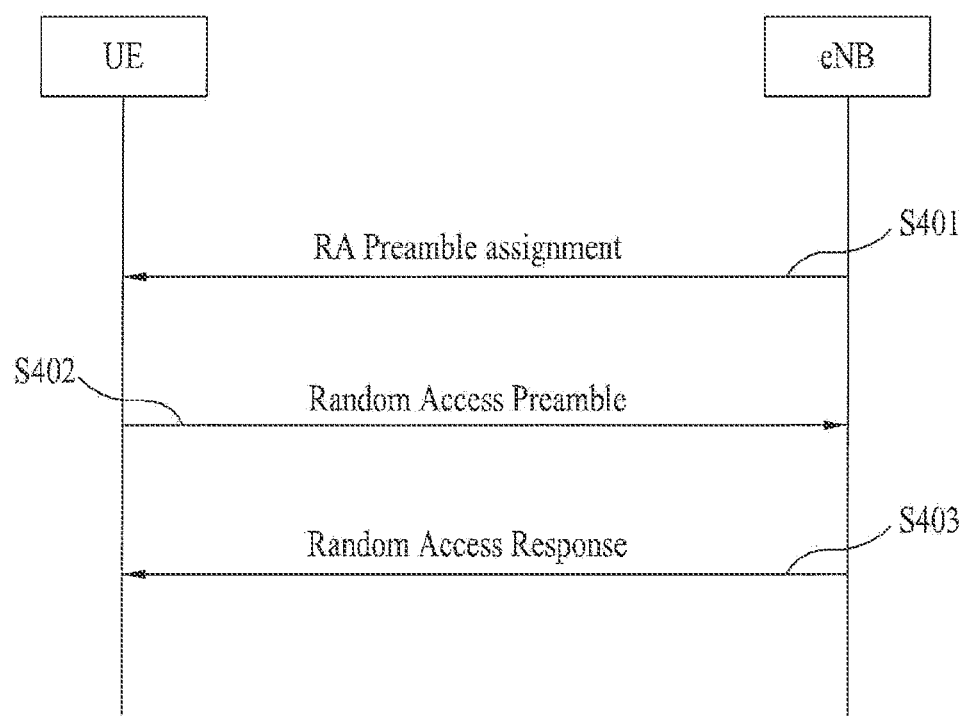
FIG. 4 is a view illustrating an operating procedure of a UE and a base station (eNode B) in a non-contention based random access procedure.

FIG. 4 is a view illustrating an operating procedure of a terminal (UE) and a base station (eNode B) in a non-contention based random access procedure.

(1) Random Access Preamble Assignment

As described above, a non-contention based random access procedure may be performed (1) in a handover procedure and (2) when the random access procedure is requested by a command of an eNode B. Even in these cases, a contention based random access procedure may be performed.

First, it is important that a specific random access preamble without the possibility of collision is received from the eNode B, for the non-contention based random access procedure. Methods of receiving the random access preamble may include a method using a handover command and a method using a Physical Downlink Control Channel (PDCCH) command. The UE receives an assigned random access preamble (S401).

(2) Message 1 Transmission

The UE transmits the preamble to the eNode B after receiving the assigned random access preamble from the eNode B as described above (S402).

(3) Message 2 Transmission

The UE attempts to receive a random access response within a random access response reception window indicated by the eNode B through a handover command or system information after transmitting the random access preamble in step S402 (S403). More specifically, the random access response information may be transmitted in the form of a Medium Access Control (MAC) Packet Data Unit (PDU), and the MAC PDU may be transferred via a Physical Downlink Shared Channel (PDSCH). In addition, the UE preferably monitors the PDCCH in order to enable to the UE to properly receive the information transferred via the PDSCH. That is, the PDCCH may preferably include information about a UE that should receive the PDSCH, frequency and time information of radio resources of the PDSCH, a transfer format of the PDSCH, and the like. Here, if the PDCCH has been successfully received, the UE may appropriately receive the random access response transmitted on the PDSCH according to information of the PDCCH. The random access response may include a random access preamble identifier (e.g. Random Access-Radio Network Temporary Identifier (RA-RNTI)), an UL Grant indicating uplink radio resources, a temporary C-RNTI, a Time Advance Command (TAC), and the like.

As described above, the reason why the random access response includes the random access preamble identifier is because a single random access response may include random access response information of at least one UE and thus it is reported to which UE the UL Grant, the Temporary C-RNTI and the TAC are valid. In this step, it is assumed that the UE selects a random access preamble identifier matched to the random access preamble selected by the UE in step S402.

In the non-contention based random access procedure, it is determined that the random access procedure is normally performed, by receiving the random access response information, and the random access procedure may be finished.

Figure 5:
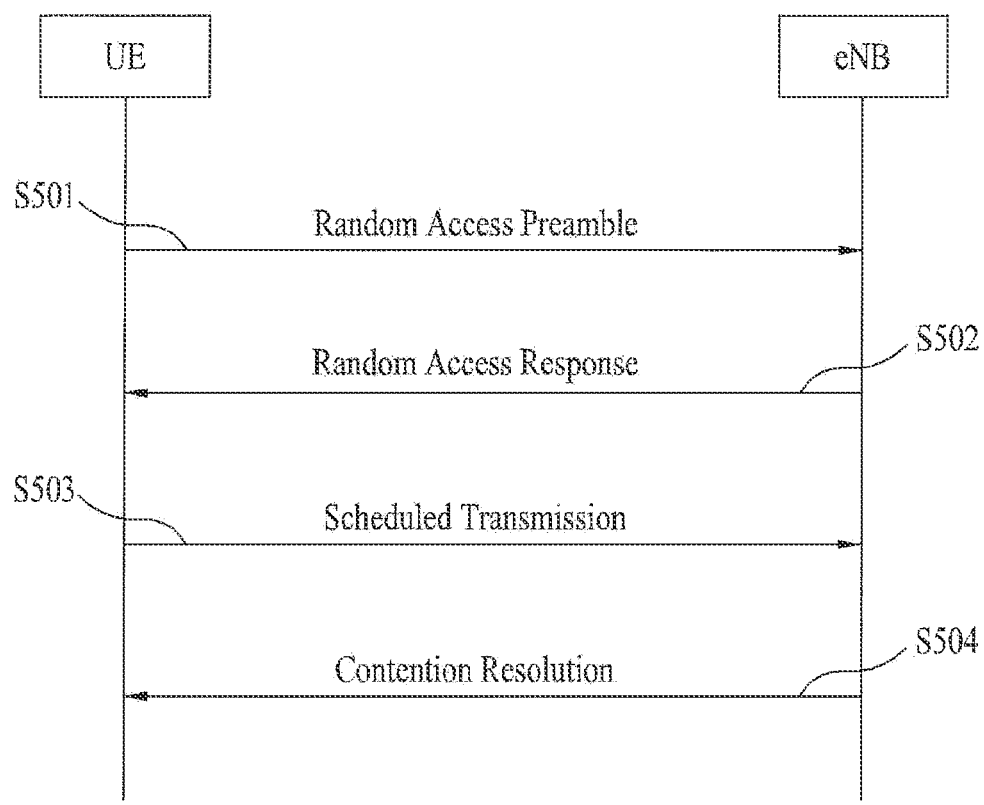
FIG. 5 is a view illustrating an operating procedure of a UE and an eNode B in a contention based random access procedure.

FIG. 5 is a view illustrating an operating procedure of a UE and an eNode B in a contention based random access procedure.

(1) Message 1 Transmission

First, the UE may randomly select a single random access preamble from a set of random access preambles indicated through system information or a handover command, and select and transmit a Physical Random Access Channel (PRACH) capable of transmitting the random access preamble (S501).

(2) Message 2 Reception

A method of receiving random access response information is similar to the above-described non-contention based random access procedure. That is, the UE attempts to receive its own random access response within a random access response reception window indicated by the eNode B through the system information or the handover command, after the random access preamble is transmitted in step S501, and receives a Physical Downlink Shared Channel (PDSCH) using random access identifier information corresponding thereto (S502). Accordingly, the UE may receive a UL Grant, a Temporary C-RNTI, a TAC and the like.

(3) Message 3 Transmission

If the UE has received the random access response valid for the UE, the UE may process all of the information included in the random access response. That is, the UE applies the TAC, and stores the temporary C-RNTI. In addition, data which will be transmitted in correspondence with the reception of the valid random access response may be stored in a Msg3 buffer. A process of storing the data in the Msg3 buffer and transmitting the data will be described later with reference to FIG. 7.

The UE uses the received UL Grant so as to transmit the data (that is, the message 3) to the eNode B (S503). The message 3 should include a UE identifier. In the contention based random access procedure, the eNode B may not determine which UEs are performing the random access procedure, but later the UEs should be identified for contention resolution.

Here, two different schemes for including the UE identifier may be provided. A first scheme is to transmit the UE's cell identifier through an uplink transmission signal corresponding to the UL Grant if the UE has already received a valid cell identifier allocated by a corresponding cell prior to the random access procedure. Conversely, the second scheme is to transmit the UE's unique identifier (e.g., S-TMSI or random ID) if the UE has not received a valid cell identifier prior to the random access procedure. In general, the unique identifier is longer than the cell identifier. If the UE has transmitted data corresponding to the UL Grant, the UE starts a contention resolution (CR) timer.

(4) Message 4 Reception

After transmitting the data with its identifier through the UL Grant included in the random access response, the UE waits for an indication (instruction) from the eNode B for contention resolution. That is, the UE attempts to receive the PDCCH so as to receive a specific message (S504). Here, there are two schemes to receive the PDCCH. As described above, the UE attempts to receive the PDCCH using its own cell identifier if the message 3 transmitted in correspondence with the UL Grant is transmitted using the UE's cell identifier, and the UE attempts to receive the PDCCH using the temporary C-RNTI included in the random access response if the identifier is its unique identifier. Thereafter, in the former scheme, if the PDCCH is received through its own cell identifier before the contention resolution timer is expired, the UE determines that the random access procedure has been normally performed and completes the random access procedure. In the latter scheme, if the PDCCH is received through the temporary C-RNTI before the contention resolution timer has expired, the UE checks data transferred by the PDSCH indicated by the PDCCH. If the unique identifier of the UE is included in the data, the UE determines that the random access procedure has been normally performed and completes the random access procedure.

Hereinafter, the LTE system, by way of example, a uplink Hybrid Automatic Repeat Request (HARQ) scheme of a MAC layer will be described, concentrating on the transmission of uplink data.

Figure 6:
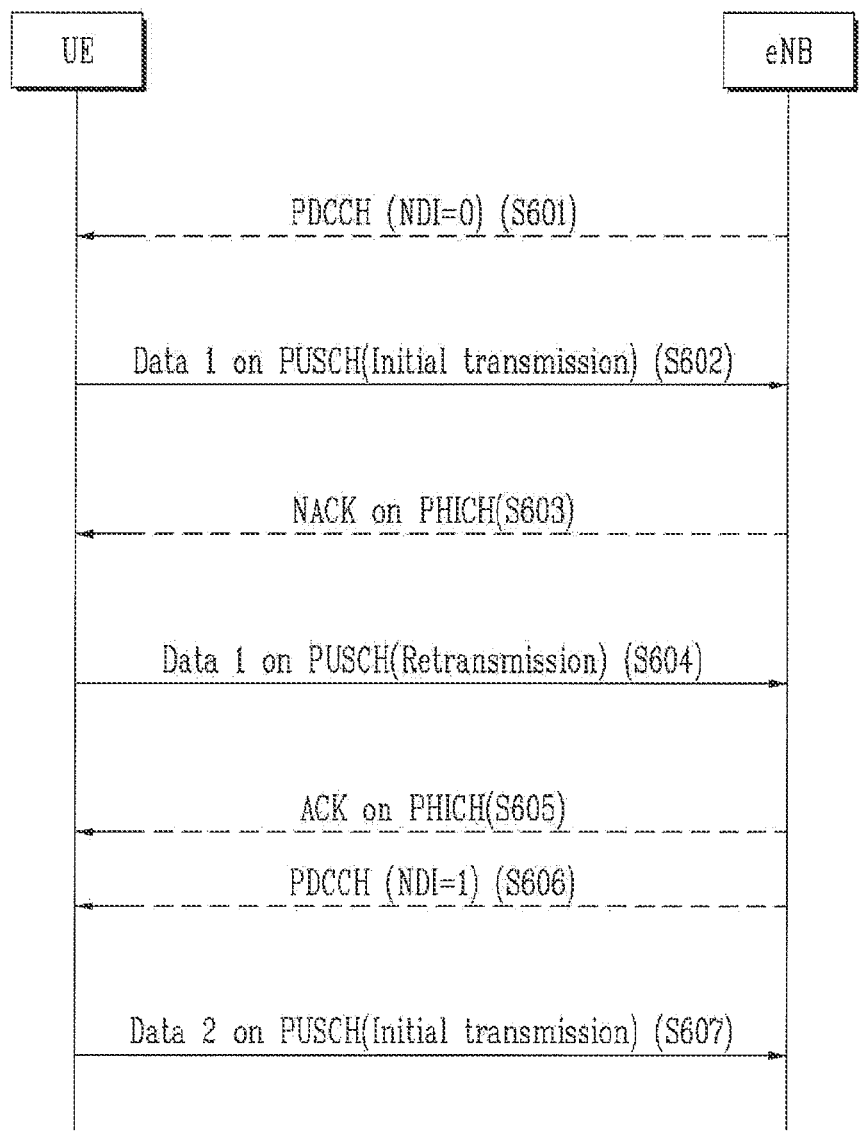
FIG. 6 is a view illustrating an uplink Hybrid Automatic Repeat Request (HARQ) scheme.

FIG. 6 is a view illustrating an HARQ scheme.

A UE may receive UL Grant information or UL scheduling information from an eNode B on a PDCCH (step S601), in order to transmit data to the eNode B by the HARQ scheme. In general, the UL scheduling information may include a UE identifier (e.g., a C-RNTI or a Semi-Persistent Scheduling C-RNTI), resource block assignment, transmission parameters (modulation, coding scheme and redundancy version), and a New Data Indicator (NDI). In the LTE system, the UE has eight HARQ processes and the HARQ processes are synchronously performed with Transmission Time Intervals (TTIs). That is, specific HARQ processes may be sequentially assigned according to points in time when data is received, in a manner of using the first HARQ process at TTI 9 and using the second HARQ process at TTI 10 after a first HARQ process is used at TTI 1, a second HARQ process is used at TTI 2, . . . , and an eighth HARQ process is used at TTI 8.

In addition, since the HARQ processes are synchronously assigned as described above, a HARQ process connected to a TTI in which a PDCCH for initial transmission of specific data is received is used for the transmission of the data. For example, if it is assumed that the UE has received a PDCCH including UL scheduling information at an $N^{th}$ TTI, the UE transmits data at an $(N+4)^{th}$ TTI. In other words, a $K^{th}$ HARQ process assigned at the $(N+4)^{th}$ TTI is used for the transmission of the data. That is, the UE may transmit the data to the eNode B on a PUSCH according to the UL scheduling information after checking the UL scheduling information transmitted to the UE by monitoring the PDCCH at every TTI (step S602).

When the data has been received, the eNode B stores the data in a soft buffer and attempts to decode the data. The eNode B transmits an ACK signal if the decoding of the data succeeds and transmits an NACK signal if the decoding of the data fails. An example in which the decoding of the data fails and the eNode B transmits the NACK signal on a Physical HARQ Indicator Channel (PHICH) is shown in FIG. 6 (step S603).

When the ACK signal has been received from the eNode B, the UE determines that the transmission of the data to the eNode B succeeds and transmits next data. However, when the UE receives the NACK signal as shown in FIG. 6, the UE may determine that the transmission of the data to the eNode B has failed and retransmit the same data by the same scheme or a new scheme (step S604).

The HARQ retransmission of the UE may be performed by a non-adaptive scheme. That is, the initial transmission of specific data may be performed when the PDCCH including the UL scheduling information should be received, but the retransmission may be performed even when the PDCCH is not received. In the non-adaptive HARQ retransmission, the data is retransmitted using the same UL scheduling information as the initial transmission at a TTI at which a next HARQ process is assigned, without receiving the PDCCH.

The HARQ retransmission of the UE may be performed by an adaptive scheme. In this case, transmission parameters for retransmission are received on the PDCCH, but the UL scheduling information included in the PDCCH may be different from that of the initial transmission according to channel statuses. For example, if the channel status is better than that of the initial transmission, transmission may be performed at a high bit rate. In contrast, if the channel status is worse than that of the initial transmission, transmission may be performed at a lower bit rate than that of the initial transmission.

If the UE receives the UL scheduling information on the PDCCH, it is determined whether data which should be transmitted at this time is data which is initially transmitted or previous data which is retransmitted, by an NDI field included in the PDCCH. The NDI field is toggled in the order of 0, 1, 0, 1, . . . whenever new data is transmitted as described above, and the NDI field of the retransmission has the same value as that of the initial transmission. Accordingly, the UE may compare the NDI field with the previously transmitted value so as to determine whether or not the data is retransmitted.

The UE counts the number of times of transmission (CURRENT_TX_NB) whenever data is transmitted by the HARQ scheme, and deletes the data stored in the HARQ buffer when CURRENT_TX_NB has reached a maximum transmission number set in an RRC layer.

When the retransmitted data is received, the eNode B attempts to combine the received data and the data stored in the soft buffer due to the failure of the decoding by various schemes and decodes the combined data. The eNode B transmits an ACK signal to the UE if the decoding succeeds and transmits an NACK signal to the UE if the decoding fails. The eNode B repeats a process of transmitting the NACK signal and receiving the retransmitted data until the decoding of the data succeeds. In the example of FIG. 6, the eNode B attempts to combine the data retransmitted in step S604 and the data which is previously received and stored and decodes the combined data. The eNode B transmits the ACK signal to the UE on the PHICH if the decoding of the received data succeeds (step S605). The UE may transmit the UL scheduling information for the transmission of next data to the UE on the PDCCH, and may transmit the NDI toggled to 1 in order to report that the UL scheduling information is not used for the adaptive retransmission, but is used for the transmission of new data (step S606). The UE may transmit new data to the eNode B on the PUSCH corresponding to the received UL scheduling information (step S607).

The random access procedure may be triggered in the above-described cases as described above. Hereinafter, the case where the UE requests UL radio resources will be described.

Figure 7:
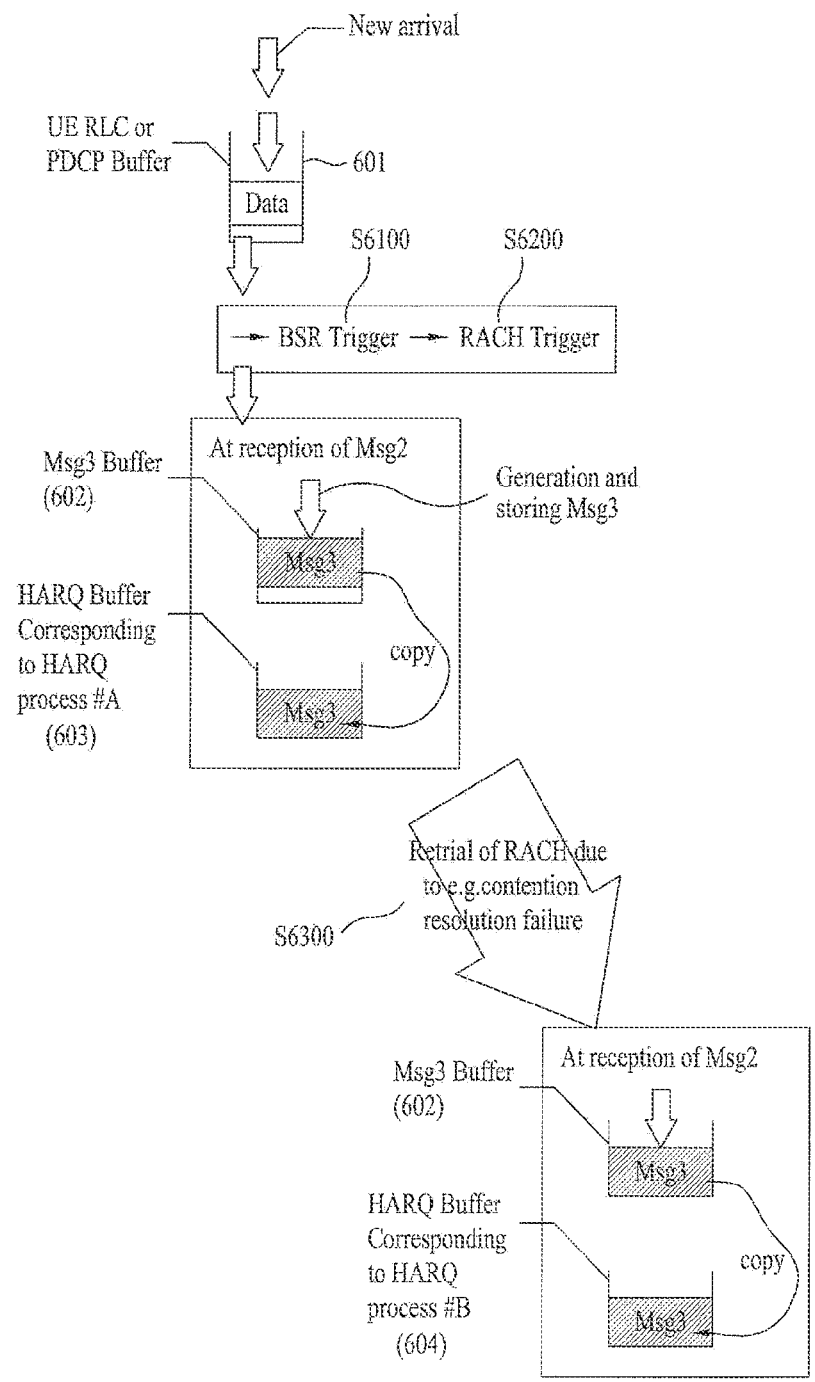
FIG. 7 is a view illustrating a method of transmitting a message 3 in a random access procedure when uplink radio resources are requested.

FIG. 7 is a view illustrating a method of transmitting a message 3 in a random access procedure when UL radio resources are requested.

When new data is generated in a transfer buffer 601 of the UE, for example, an RLC buffer and a PDCP buffer, the UE should generally inform the eNode B of information about the generation of the data. More accurately, when data having priority higher than that of data stored in the transfer buffer of the UE is generated, the UE informs the eNode B that the data is generated.

This indicates that the UE requests radio resources to the eNode B in order to transmit the generated data. The eNode B may assign proper radio resources to the UE according to the above information. The information about the generation of the data is called a buffer status report (hereinafter, referred to as "BSR"). Hereinafter, as described above, the request for the transmission of the BSR is represented by triggering of the BSR transmission (S6100). If the BSR transmission is triggered, the UE should transmit the BSR to the eNode B. However, if the radio resources for transmitting the BSR are not present, the UE may trigger a random access procedure and attempt to request radio resources (S6200).

As described above, if the random access procedure for requesting the radio resources to the eNode B is triggered, the UE may transmit a random access preamble to the eNode B and receive a random access response message corresponding thereto as described with reference to FIGS. 4 and 5. In addition, a message 3 (that is, a MAC PDU) including a UE identifier and a BSR may be generated and stored in a Msg3 buffer 602, in a MAC layer of the UE through a UL Grant signal included in the random access response message. The message 3 stored in the Msg3 buffer 602 may be copied and stored in a HARQ process buffer 603 indicated by the UL Grant information. FIG. 7 shows, by way of example, the case where the HARQ process A is used for the transmission of the message 3. Thus, the message 3 is copied to the HARQ buffer 603 corresponding to the HARQ process A. The message 3 stored in the HARQ buffer 603 may be transmitted to the eNode B on a PUSCH.

Meanwhile, if the UE should perform retrial of the random access procedure due to contention resolution failure, the UE may transmit the random access preamble to the eNode B again and receive a random access response (S6300). However, in the retried random access procedure, the UE uses the message 3 stored in the Msg3 buffer 602 again, without generating a new message 3. That is, the UE may copy and store the MAC PDU corresponding to the message 3 stored in the Msg3 buffer 602 in a HARQ buffer 604, and transmit the MAC PDU, according to the UL Grant signal included in the random access response received in the retried random access procedure. FIG. 7 shows the case where the reattempted random access procedure is performed by a HARQ process B. The data stored in the Msg3 buffer 602 may be copied into the HARQ buffer B and transmitted.

As described above, if the random access response is received while the random access procedure is performed, the UE stores the message 3 stored in the Msg3 buffer in the HARQ buffer and transmits the message 3. As described above, in the current the LTE system standard for the HARQ process, it is defined that the transmission of the data stored in the Msg3 buffer is triggered by the reception of any UL Grant signal. Accordingly, the CR timer may be erroneously driven such that an erroneous contention resolution process is performed. Due to the erroneous contention resolution procedure, the above-described BSR may not be normally transmitted and the UE may come to deadlock. This problem will be described in detail with reference to FIG. 8.

Figure 8:
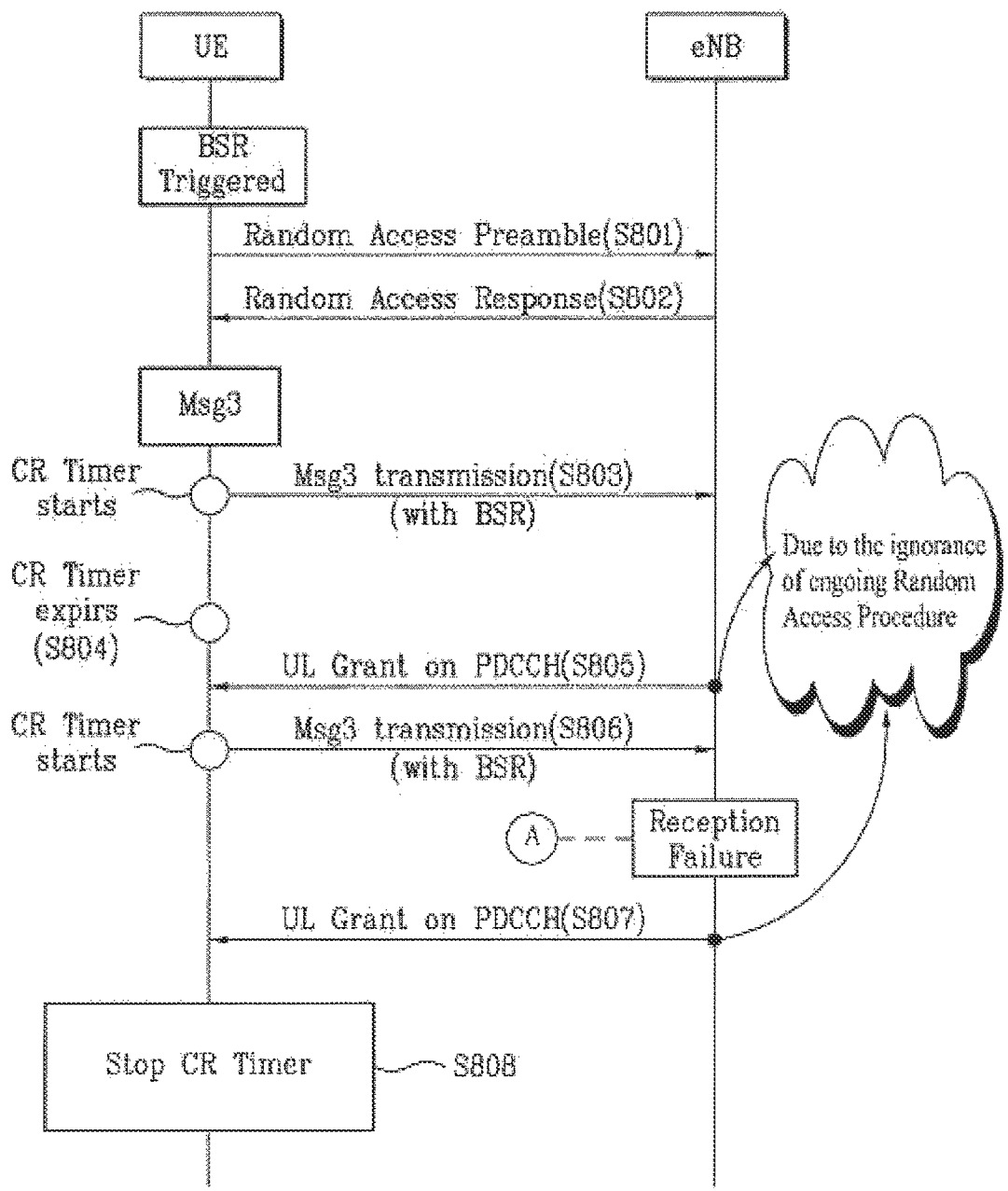
FIG. 8 is a view illustrating a problem which may occur when data stored in a message 3 buffer is transmitted by an Uplink (UL) Grant signal received on a message other than a random access response message.

FIG. 8 is a view illustrating a problem which may occur when data stored in a Msg3 buffer is transmitted by an Uplink (UL) Grant signal received on a message other than a random access response message.

As described with reference to FIG. 7, the UE may trigger the BSR when high priority data is generated, transmit the random access preamble in order to transmit the BSR to the eNode B (S801), and receive the random access response corresponding thereto (S802).

Thereafter, the UE may transmit a message 3 including the BSR via UL Grant information included in the random access response message received in step S802 (S803). If the message 3 is transmitted, the CR timer is operated as described with reference to FIG. 5.

If the random access procedure is completed before the CR timer expires, the UE determines that the random access procedure has not been successfully completed (S804). In this case, the UE may try to restart the random access procedure from the transmission of the random access preamble.

At this time, since the eNode B does not yet know that the UE is performing the random access procedure, the eNode B may transmit a UL Grant signal independent of the random access procedure on a masked PDCCH (S805). In this case, according to the current LTE system standard, the UE transmits the message 3 stored in the Msg3 buffer according to the UT, Grant signal received on the PDCCH in step S805 (S806). In addition, when the message 3 is transmitted, the CR timer is restarted. That is, even when the UE does not perform the transmission of the random access preamble and the reception of the random access response message, the CR timer is restarted in step S806.

Although the CR timer is started as the UE transmits the message 3 in step S806, the eNode B may not know that the UE is performing the random access procedure because the reception of the random access preamble and the transmission of the random access response message are not performed. If another UL Grant signal is received on the PDCCH including the UE identifier (S807), the UE determines that the ongoing random access procedure is successfully completed. Accordingly, the UE may stop the ongoing CR time (S808).

If the message 3 transmitted to the eNode B in step S806 is not successfully received by the eNode B (A), the UE no longer transmits the message 3 including the BSR. Accordingly, if additional data is not generated, the UE may not transmit the data generated in the transfer buffer to the eNode B.

The above-described problem will be described as follows.

According to the current LTE system standard, if the UL Grant signal is received in a state in which the data is stored in the Msg3 buffer, the UE transmits the data stored in the Msg3 buffer to the eNode B. At this time, the UL Grant signal may be transmitted by the eNode B, not for the transmission of the data stored in the Msg3 buffer, but for the transmission of other data. Accordingly, the CR timer may be erroneously started.

In addition, if the eNode B does not know that the CR timer is erroneously started in the UE and transmits the UL Grant signal for the transmission of other data as described with reference to FIG. 8, information (e.g., BSR) to be transmitted through the message 3 may be lost.

In addition, the UE may not receive a message 4 for completing a proper contention resolution procedure even with respect to the ongoing random access procedure.

In a preferred embodiment of the invention for solving the above-described problem, the data stored in the Msg3 buffer is restrictively transmitted only in the case where the UL Grant signal received from the eNode B is received on the random access response message, but not in all cases where the UL Grant signal is received from the eNode B. If the UL Grant signal is received on the masked PDCCH not by the random access response message but by the UE identifier (C-RNTI or a Semi Persistent Scheduling Radio Network Temporary Identifier (SPS-RNTI)) in a state in which the data is stored in the Msg3 buffer, a method of acquiring and transmitting new data (MAC PDU) to the eNode B instead of the data stored in the Msg3 buffer is suggested.

Figure 9:
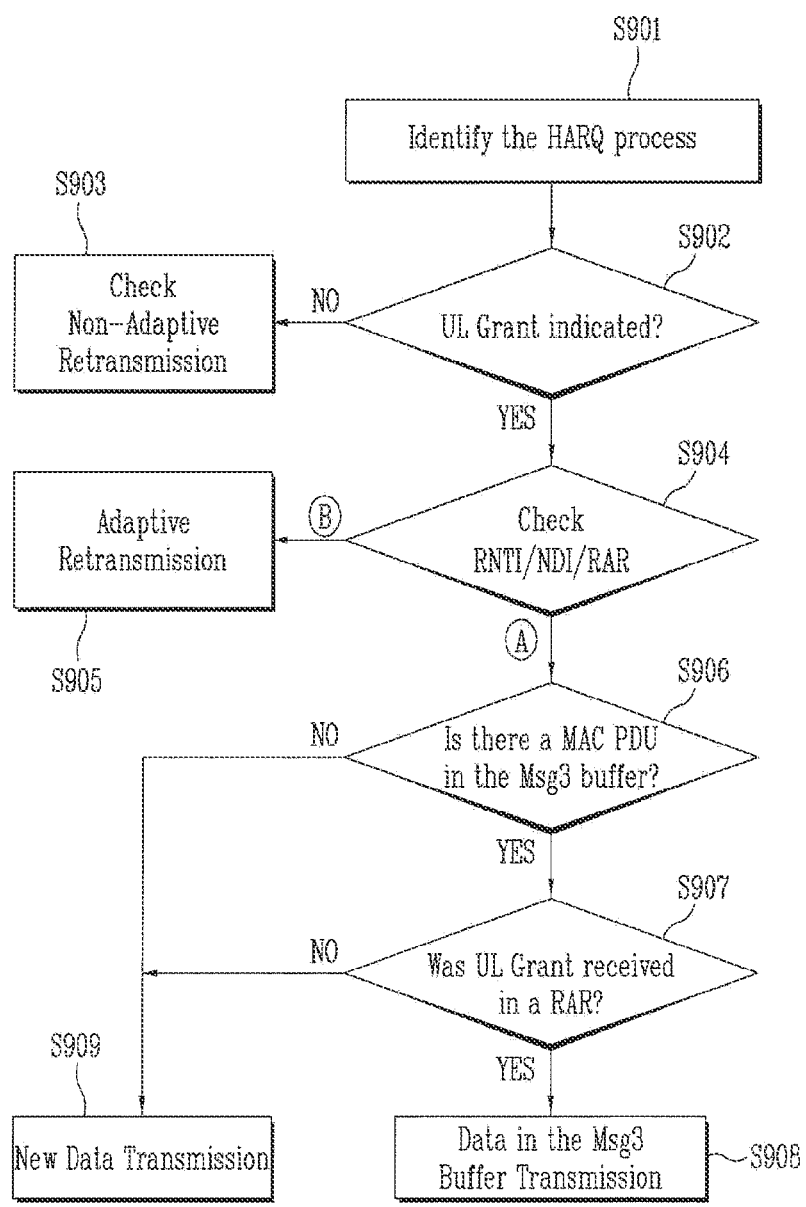
FIG. 9 is a flowchart illustrating a method of transmitting uplink data by a UE according to a preferred embodiment of the present invention.

FIG. 9 is a flowchart illustrating a method of transmitting UL data by a UE according to a preferred embodiment of the present invention. In more detail, FIG. 9 shows the operation of a HARQ entity of the UE according to an embodiment of the present invention at every TTI.

First, the HARQ entity of the UE may identify a HARQ process associated with a TTI (S901). If the HARQ process associated with the TTI is identified, the HARQ entity of the UE may determine whether or not a UL Grant signal received from the eNode B indicated at the TTI (S902). The UE may determine whether or not a HARQ buffer corresponding to the HARQ process is empty if there is no information about the received UL Grant signal at the TTI, and perform non-adaptive retransmission as described with reference to FIG. 6 if there is data in the HARQ buffer (S903).

Meanwhile, if there is a UL Grant signal received from the eNode B at the TTI, it may be determined (1) whether the UL Grant signal is not received on the PDCCH indicated by the temporary C-RNTI and the NDI is toggled from the value during transmission prior to the HARQ process, (2) whether there is previous NDI and this transmission is initial transmission of the HARQ process, (3) whether the UL Grant signal is received on the PDCCH indicated by the C-RNTI and the HARQ buffer of the HARQ process is empty, or (4) whether the UL Grant signal is received on the random access response message (S904). If any one of the conditions (1) to (4) is satisfied in step S904 (A), the method progresses to step S906. In contrast, if any one of the conditions (1) to (4) is not satisfied in step S904 (B), the method progresses to step S905 of performing adaptive retransmission using the UL Grant signal (S905).

Meanwhile, the UE determines whether there is data iri the Msg3 buffer in step S906 (S906). In addition, even when there is data in the Msg3 buffer, the UE determines whether the received UL Grant signal is received on the random access response message (S907). That is, the UE according to the present embodiment transmits the data stored in the Msg3 buffer only when there is data in the Msg3 buffer when receiving the UL Grant signal and the UL Grant signal is received on the random access response message (S908). If there is no data in the Msg3 buffer when receiving the UL Grant signal or the UL Grant is not received on the random access response message, the UE determines that the eNode B makes a request not for the transmission of the data stored in the Msg3 buffer but for transmission of new data, and performs new data transmission (S909). In more detail, the HARQ entity of the UE may be controlled such that a MAC PDU including new data from a multiplexing and assembly entity is acquired and is transmitted through the HARQ process.

Hereinafter, an example applied to a process of transmitting a BSR by the UE which operates by the embodiment described with reference to FIG. 9 as shown in FIG. 8 will be described.

Figure 10:
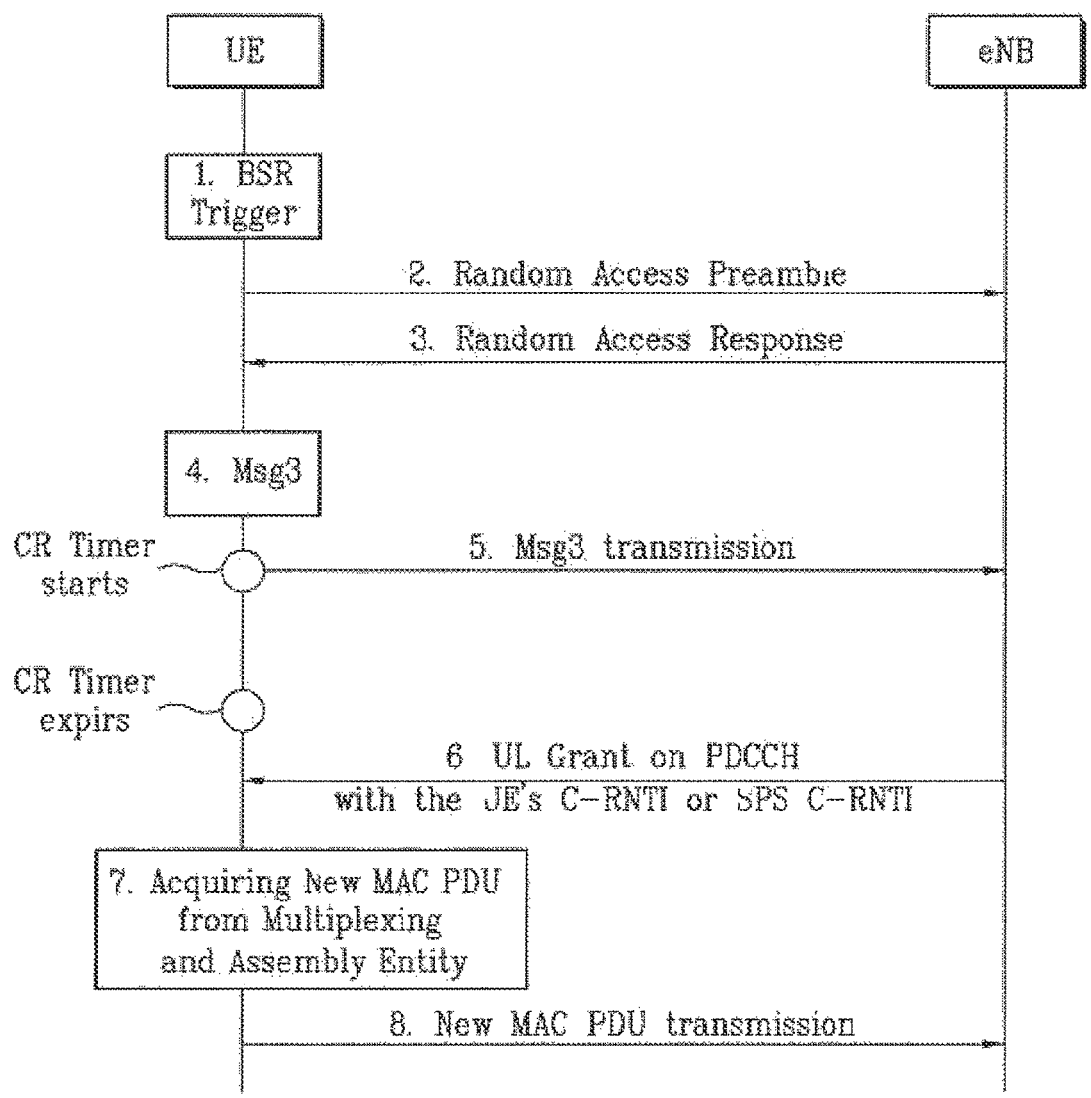
FIG. 10 is a view illustrating a method of transmitting uplink data when a Buffer status Report (BSR) is triggered in a UE, according to an embodiment of the present invention.

FIG. 10 is a view illustrating a method of transmitting UL data when a BSR is triggered in a UE, according to an embodiment of the present invention.

As described above, new data may be generated in the RLC and PDCP buffers of the UE. It is assumed that the generated new data has higher priority than that of the data already stored in the RLC and PDCP buffers. The UE may trigger the BSR transmission in order to inform an eNode B of information about the generation of the data (step 1).

The UE should transmit the BSR according to BSR transmission trigger, but, in a special case, there may be no radio resource for transmitting the BSR. In this case, the UE may trigger a random access procedure for transmitting the BSR. It is assumed that the random access procedure triggered in the present embodiment is the contention based random access procedure described with reference to FIG. 5.

The UE may transmit a random access preamble to the eNode B according to the triggering of the random access procedure (step 2).

The eNode B may receive the random access preamble transmitted by the UE and transmit a random access response message to the UE (step 3). The UE may receive the random access response message.

The UE may generate a message 3 including the BSR and a UE identifier according to a UL Grant signal included in the random access response message received in step 3 and store the message 3 in a Msg3 buffer (step 4).

The UE may select a HARQ process according to the UL Grant information included in the random access response message received in step 3 and copy and store the message 3 stored in the Msg3 buffer in the buffer corresponding to the selected HARQ process. Thereafter, the data stored in the HARQ buffer may be transmitted to the eNode B according to the UL HARQ procedure described with reference to FIG. 6 (step 5). The UE starts (or restarts) the CR timer by the transmission of the message 3.

When the CR timer expires, the UE may perform retrial of the random access procedure. That is, a random access preamble and a PRACH resource may be prepared to be selected and transmitted to the eNode B. However, in a state in which the CR timer is not operated, the UE may receive the UL Grant signal from the eNode B on a PDCCH masked by a UE identifier (step 6).

When the UL Grant signal has been received on the PDCCH in step 6, the UE generates new data different from the data stored in the Msg3 buffer according to the UL Grant information received in step 6 as a new MAC PDU, unlike the procedure of the embodiment of FIG. 8 for transmitting the message 3 stored in the Msg3 buffer according to the UL Grant information received in step 6 (step 7). In more detail, if the UE receives the UL Grant signal in step 6 but does not receive the UL Grant signal on the random access response message, a MAC PDU for transmitting not the data stored in the Msg3 buffer but new data from a multiplexing and assembly entity may be acquired and transmitted using a HARQ process corresponding thereto.

After the new MAC PDU is generated, the UE according to the present embodiment may select a HARQ process according to the UL Grant signal received in step 6, store the MAC PDU newly generated in step 7 in the buffer corresponding to the HARQ process, and transmit the MAC PDU to the eNode B according to the UL HARQ procedure (step 8).

Thereafter, the UE may perform a random access procedure including the transmission of the random access preamble and the reception of the random access response and transmit the BSR stored in the Msg3 buffer to the eNode B.

According to the above-described embodiment, it is possible to prevent the eNode B from erroneously operating the CR timer due to the UL Grant signal transmitted not for transmission of the data stored in the Msg3 buffer but for transmission of new data. Accordingly, the problem that the message 3 is lost may be solved. In addition, the random access procedure of the UE with the eNode B may be normally performed.

Unlike the above-described embodiment, as another embodiment of the present invention, a method of performing a process while ignoring the UL Grant signal if the UL Grant signal is received from the eNode B on the PDCCH masked by the UE identifier during the random access procedure of the UE may be implemented. In this case, the UE may transfer the message 3 to the eNode B by the normal random access procedure, and the eNode B may retransmit the UL Grant signal for the transmission of new data after the random access procedure of the UE is completed.

Hereinafter, the configuration of the UE for implementing the above-described embodiment of the present invention will be described.

Figure 11:
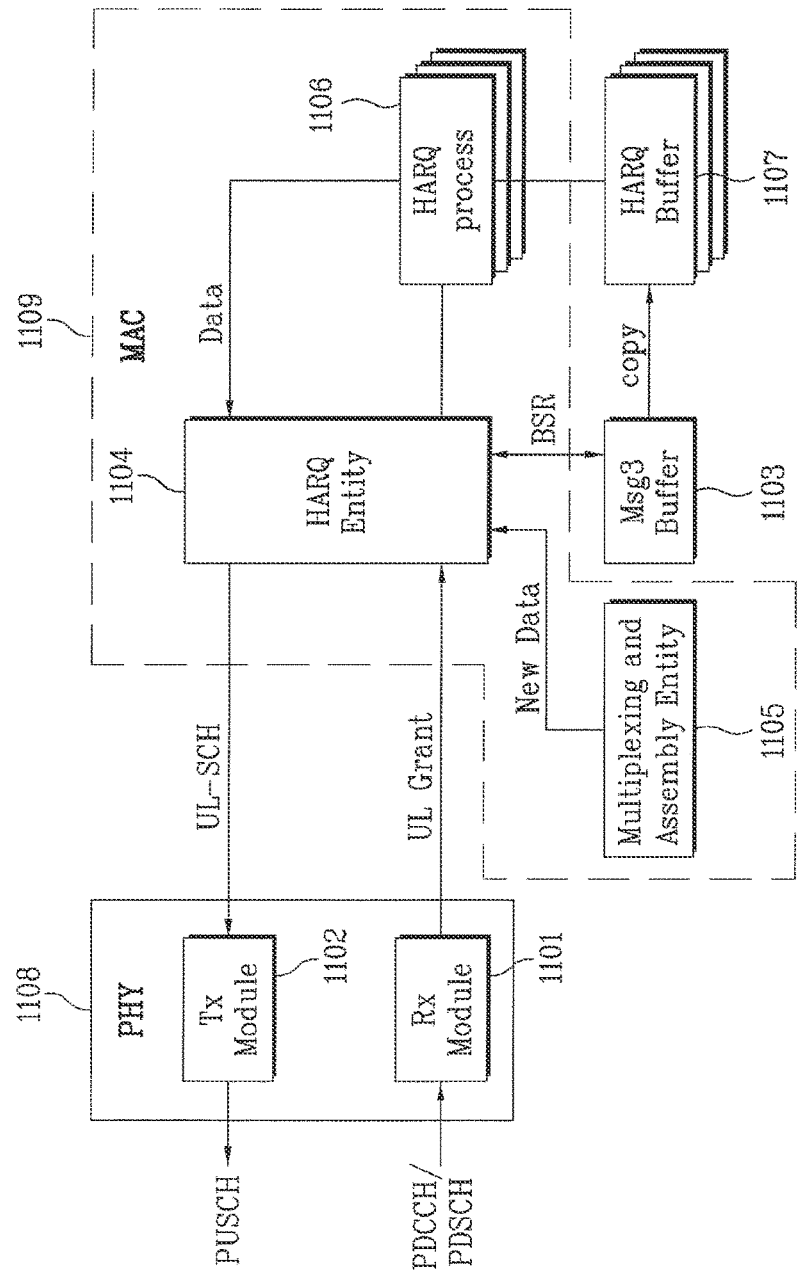
FIG. 11 is a schematic view showing the configuration of a UE according to an embodiment of the present invention.

FIG. 11 is a schematic view showing the configuration of a UE according to an embodiment of the present invention.

As shown in FIG. 11, the UE according to the present embodiment may include a reception (Rx) module 1101 for receiving a UL Grant signal from an eNode B on a specific message, a transmission (TX) module 1102 for transmitting data to the eNode B using the received UL Grant signal, a Msg3 buffer 1103 for storing UL data transmitted in a random access procedure, and a HARQ entity 1104 for controlling the transmission of UL data of the UE.

In particular, the HARQ entity 1104 of the UE according to the present embodiment performs a function of determining whether there is data stored in the Msg3 buffer 1103 when the Rx module 1101 receives the UL Grant signal and a function of determining whether the Rx module 1101 receives the UL Grant signal on a random access response message. If there is data stored in the Msg3 buffer 1103 when the Rx module 1101 receives the UL Grant signal and the RX module 1101 receives the UL Grant signal on the random access response message, the data stored in the Msg3 buffer 1103 is controlled to be acquired and transmitted to the eNode B. If there is no data stored in the Msg3 buffer 1103 when the Rx module 1101 receives the UL Grant signal and the RX module 1101 receives the UL Grant signal not on the random access response message but on the PDCCH, the data stored in the Msg3 buffer 1103 is not transmitted but new data is acquired from the multiplexing and assembly entity in the form of a MAC PDU and is transmitted to the eNode B.

In addition, in order to perform the UL HARQ procedure, the UE according to the present embodiment may include one or more HARQ processes 1106 and HARQ buffers 1107 corresponding to the HARQ processes 1106. In the current LTE system, eight independent HARQ processes are defined for use, but the present invention is not limited thereto.

Meanwhile, the HARQ entity 1104 according to the present embodiment may transfer the data acquired from the multiplexing and assembly entity 1105 or the msg3 buffer 1103 to a specific HARQ process 1106 using the above-described configuration, and control the specific HARQ process 1106 to transmit the data acquired from the multiplexing and assembly entity 1105 or the Msg3 buffer 1103 through the Tx module 1102. As described above, if the specific HARQ process 1106 transmits the data stored in the Msg3 buffer 1103 through the Tx module 1102 as described above, the data stored in the Msg3 buffer 1103 may be copied into the specific HARQ buffer 1107 corresponding to the specific HARQ process 1106 and the data copied into the specific HARQ buffer 1107 may be transmitted through the Tx module 1102.

At this time, the data stored in the Msg3 buffer 1103 is a MAC PDU including a UE identifier and may further include information such as a BSR according to the purpose of the random access procedure.

In the configuration of the UE shown in FIG. 11, the Tx module 1102 and the Rx module 1101 may be configured as a physical layer processing module 1108, and the HARQ entity 1104, the multiplexing and assembly entity 1105 and one or more HARQ processes 1106 may be configured as a MAC layer module 1109. However, the invention is not limited thereto. In addition, the Msg3 buffer 1103 and the HARQ buffers 1107 corresponding to the HARQ processes 1106 may be implemented using any storage medium.

Although the signal transmission or reception technology and the UE for the same are applied to a 3GPP LTE system, they are applicable to various mobile communication systems having a similar procedure, in addition to the 3GPP LTE system.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method of transmitting data by a user equipment through an uplink, the method comprising:
   receiving on a first physical downlink control channel (PDCCH) during a random access procedure and with data stored in a message 3 (Msg3) buffer, a first uplink (UL) grant signal having a toggled new data indicator (NDI);
   transmitting new data to the base station based on the first UL grant signal;
   receiving, during the random access procedure and subsequent to the reception of the first UL grant signal on a second PDCCH and with data stored in the Msg3 buffer, a random access response message including a second UL grant signal from a base station;
   transmitting the data stored in the Msg3 buffer to the base station based on the second UL grant signal;
   during a second random access procedure with data stored in a Msg3 buffer, receiving on a third PDCCH a third UL grant signal and transmitting new data to the base station based on the third UL grant signal;
   during a third random access procedure with data stored in a Msg3 buffer, receiving a random access response message including a fourth UL grant signal and transmitting the data stored in the Msg3 buffer to the base station based on the fourth UL grant signal;
   during a fourth random access procedure with no data stored in a Msg3 buffer, receiving on a fourth PDCCH a fifth UL grant signal and transmitting new data to the base station based on the fifth UL grant signal; and
   during a fifth random access procedure with no data stored in a Msg3 buffer, receiving a random access response message including a sixth UL grant signal and transmitting new data to the base station based on the sixth UL grant signal.

2. The method according to claim 1 wherein a number of hybrid automatic repeat request (HARQ) processes of the UE is not eight.

3. The method according to claim 2 wherein a number of the HARQ processes of the UE is greater than eight.

4. The method according to claim 1, wherein the received first uplink (UL) grant signal is not received based on a link failure.

5. The method according to claim 1, wherein the transmitting the new data to the base station includes: acquiring a Medium Access Control Protocol Data Unit (MAC PDU) from a multiplexing and assembly entity, wherein the MAC PDU is transmitted as the new data.

6. The method according to claim 2, wherein the first UL Grant signal is received on the first PDCCH related to one of Cell-Radio Network Temporary Identifier (RNTI) and Temporary Cell-RNTI.

7. The method according to claim 1, wherein the data stored in the Msg3 buffer is a Medium Access Control Protocol Data Unit (MAC PDU) including a user equipment identifier.

8. The method according to claim 7, wherein the data stored in the Msg3 buffer further includes information about a buffer status report (BSR) if the user equipment starts a random access procedure for the BSR.

9. The method according to claim 1 wherein a hybrid automatic repeat request (HARQ) process selected to transmit the new data is based on the received first UL grant.

10. The method according to claim 9, wherein a number of HARQ processes for uplink transmission is greater than 8.

11. The method according to claim 10, further comprising receiving configuration information from the base station and the number of HARQ processes for the uplink is derived from the received configuration information.

12. The method according to claim 9 wherein the HARQ process is not sequentially assigned.

13. The method according to claim 9 wherein the HARQ process is not sequentially assigned based on a transmission time interval (TTI).

14. The method according to claim 1 wherein a hybrid automatic repeat request (HARQ) process selected to transmit the data stored in the Msg3 buffer data is not based on a transmission time interval associated with the random access response message.

15. The method according to claim 1 further comprising ignoring an UL grant signal received on the PDCCH masked by a UE identifier of the UE.

16. The method according to claim 15 wherein the ignoring of the UL grant signal is during a random access procedure.

17. A user equipment for transmitting data through an uplink, the user equipment comprising:
    a receiver configured to receive on a physical downlink control channel (PDCCH) during a first random access procedure and with data stored in a message 3 (Msg3) buffer, a first uplink (UL) grant signal having a toggled new data indicator (NDI);
    a transmitter configured to transmit new data to the base station based on the first UL grant signal;
    the receiver further configured to receive, during the first random access procedure and subsequent to the reception of the first UL grant signal on a second PDCCH and with data stored in the Msg3 buffer, a random access response message including a second UL grant signal from a base station;
    the transmitter further configured to transmit the data stored in the Msg3 buffer to the base station based on the second UL grant signal;
    the receiver is further configured to, during a second random access procedure with data stored in a Msg3 buffer, receiving on a third PDCCH a third UL grant signal and the transmitter is further configured to transmit new data to the base station based on the third UL grant signal;
    the receiver is further configured to, during a third random access procedure with data stored in a Msg3 buffer, receive a random access response message including a fourth UL grant signal and the transmitter is further configured to transmit the data stored in the Msg3 buffer to the base station based on the fourth UL grant signal;
    the receiver is further configured to, during a fourth random access procedure with no data stored in a Msg3 buffer, receive on a fourth PDCCH a fifth UL grant signal and the transmitter is further configured to transmit new data to the base station based on the fifth UL grant signal; and the receiver is further configured to, during a fifth random access procedure with no data stored in a Msg3 buffer, receive a random access response message including a sixth UL grant signal and the transmitter is further configured to transmit new data to the base station based on the sixth UL grant signal.

18. The user equipment according to claim 17 wherein a number of hybrid automatic repeat request (HARQ) processes of the UE is not eight.

19. The user equipment according to claim 18 wherein a number of the HARQ processes of the UE is greater than eight.

20. The user equipment according to claim 17, wherein the received first uplink (UL) grant signal is not received based on a link failure.

21. The user equipment according to claim 17, wherein the transmitting module is further configured to acquire a Medium Access Control Protocol Data Unit (MAC PDU) from a multiplexing and assembly entity, wherein the acquired MAC PDU is transmitted as the new data.

22. The user equipment according to claim 18, wherein the first UL Grant signal is received on the first PDCCH related to one of Cell-Radio Network Temporary Identifier (RNTI) and Temporary Cell-RNTI.

23. The user equipment according to claim 17, wherein the data stored in the Msg3 buffer is a Medium Access Control Protocol Data Unit (MAC PDU) including a user equipment identifier.

24. The user equipment according to claim 23, wherein the data stored in the Msg3 buffer further includes information about a buffer status report (BSR) if the user equipment starts a random access procedure for the BSR.

25. The user equipment according to claim 17 wherein a hybrid automatic repeat request (HARQ) process selected to transmit the new data is based on the received first UL grant.

26. The user equipment according to claim 25, wherein a number of HARQ processes for uplink transmission is greater than 8.

27. The user equipment according to claim 26, wherein the receiver is further configured to receive configuration information from the base station and the number of HARQ processes for the uplink is derived from the received configuration information.

28. The user equipment according to claim 25 wherein the HARQ process is not sequentially assigned.

29. The user equipment according to claim 25 wherein the HARQ process is not sequentially assigned based on a transmission time interval (TTI).

30. The user equipment according to claim 17 wherein a hybrid automatic repeat request (HARQ) process selected to transmit the data stored in the Msg3 buffer data is not based on a transmission time interval associated with the random access response message.

31. The user equipment according to claim 17 the receiver further configured to ignore an UL grant signal received on the PDCCH masked by a UE identifier of the UE.

32. The user equipment according to claim 31 wherein the ignored UL grant signal is during a random access procedure.

* * * * *